US007263355B2

(12) United States Patent
Morikawa et al.

(10) Patent No.: US 7,263,355 B2
(45) Date of Patent: Aug. 28, 2007

(54) TEST APPARATUS AND METHOD WHICH CAN SIMULTANEOUSLY EXECUTE VARIOUS TESTS OF ONE OR A PLURALITY OF RADIO COMMUNICATION TERMINALS OF VARIOUS TYPES OF COMMUNICATION SYSTEMS

(75) Inventors: Takayuki Morikawa, Yokohama (JP); Tsuyoshi Doi, Atsugi (JP); Osamu Miyashita, Hadano (JP)

(73) Assignee: Anritsu Corporation, Tokyo (JP)

( * ) Notice: Subject to any disclaimer, the term of this patent is extended or adjusted under 35 U.S.C. 154(b) by 204 days.

(21) Appl. No.: 10/866,298

(22) Filed: Jun. 10, 2004

(65) Prior Publication Data

US 2004/0266423 A1 Dec. 30, 2004

(30) Foreign Application Priority Data

Jun. 16, 2003 (JP) ............................. 2003-171058

(51) Int. Cl.
*H04B 17/00* (2006.01)

(52) U.S. Cl. ...................... 455/424; 379/21; 379/29; 455/553; 455/556

(58) Field of Classification Search ................ 455/424, 455/423, 553, 556; 379/21, 27, 28, 29
See application file for complete search history.

(56) References Cited

U.S. PATENT DOCUMENTS

| | | | |
|---|---|---|---|
| 5,907,797 A | | 5/1999 | Hanatatsu et al. |
| 5,910,977 A | * | 6/1999 | Torregrossa ............. 379/27.01 |
| 6,112,067 A | | 8/2000 | Seike et al. |
| 6,243,576 B1 | | 6/2001 | Seike et al. |
| 6,516,053 B1 | * | 2/2003 | Ryan et al. .................... 379/21 |
| 6,738,454 B2 | * | 5/2004 | Mohammadian et al. ..... 379/21 |
| 2002/0151325 A1 | | 10/2002 | Fitton et al. |
| 2002/0183054 A1 | | 12/2002 | Rimoni et al. |

FOREIGN PATENT DOCUMENTS

| | | |
|---|---|---|
| DE | 41 24 617 A1 | 1/1993 |
| DE | 197 08 793 C1 | 4/1998 |
| JP | 5-15545 A | 2/1993 |
| JP | 8-228185 A | 9/1996 |

(Continued)

*Primary Examiner*—Jean Gelin
*Assistant Examiner*—Michael Vu
(74) *Attorney, Agent, or Firm*—Frishauf, Holtz, Goodman & Chick, P.C.

(57) ABSTRACT

A test apparatus main body mounted in a single housing has a connection unit, a common bus, terminal control units, measurement units, and a total control unit. The connection unit can connect at least two terminals of identical or different type of communication systems. The terminal control units output test signals including signals that respectively control the terminals which can be connected to the connection unit based on predetermined test programs according to the type of communication systems, and measurement instructions, which are supplied via the common bus. The second measurement units perform measurements designated by the measurement instructions upon reception of response signals which are output from the terminals in response to the test signals from the terminal control units. The total control unit supplies, in advance, the predetermined test programs according to the type of communication systems and outputs the measurement instructions at predetermined timings to the terminal control units.

28 Claims, 8 Drawing Sheets

FOREIGN PATENT DOCUMENTS

| | | |
|---|---|---|
| JP | 11-274998 A | 10/1999 |
| JP | 2000-183831 A | 6/2000 |
| JP | 2001-045539 A | 2/2001 |
| JP | 2002-335255 A | 11/2002 |
| JP | 2003-143055 A | 5/2003 |
| WO | WO 00/38449 A1 | 6/2000 |
| WO | 02/082670 A2 | 10/2002 |

\* cited by examiner

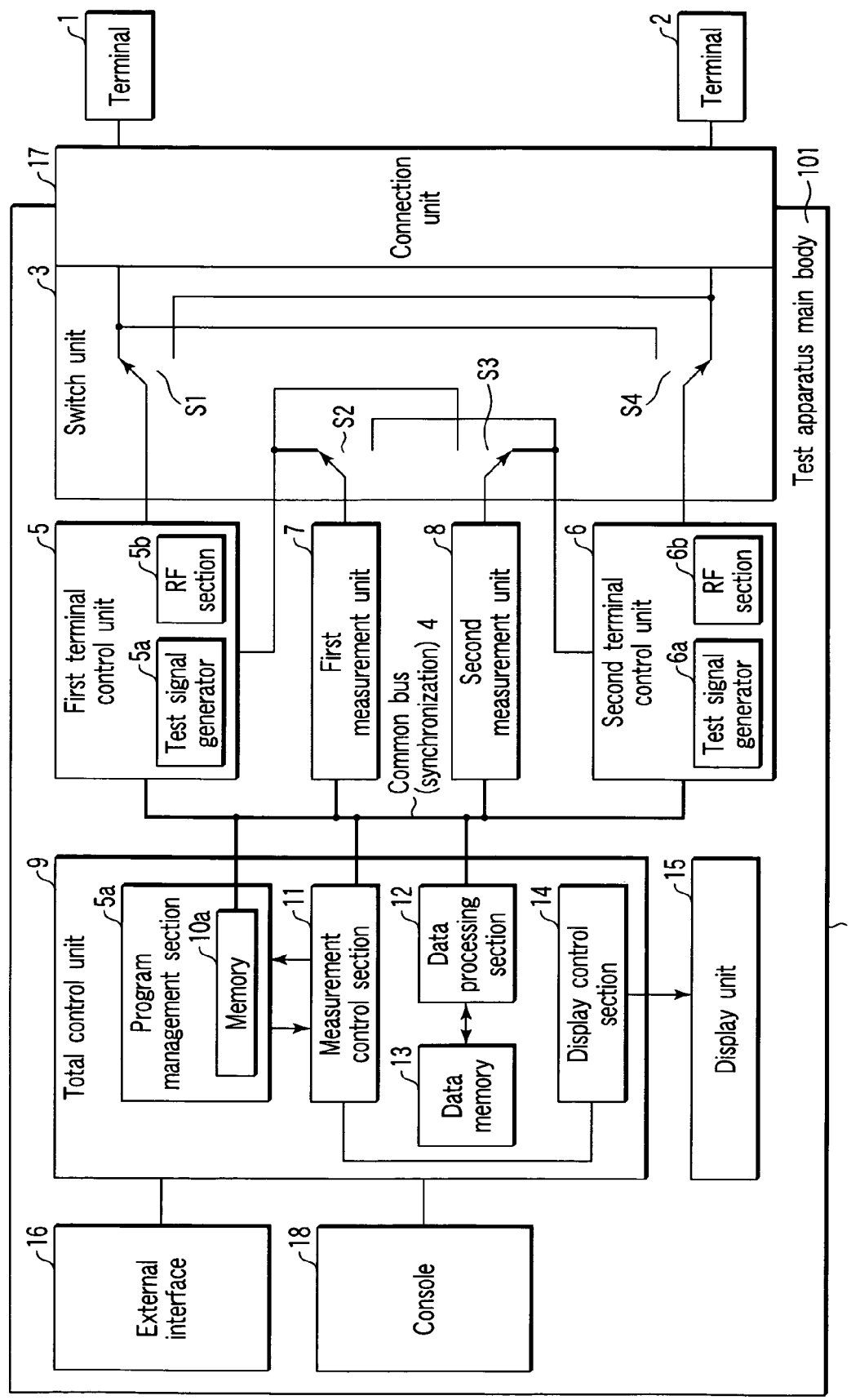
F I G. 1

| Terminal control unit 5 | Terminal control unit 6 | Terminal 1 | Measurement |
|---|---|---|---|
| W-CDMA | GSM | W-CDMA/GSM dual-mode | General |
|  |  |  |  |
|  |  |  |  |

| Terminal control unit 5 | Terminal control unit 6 | Terminal 1 | Measurement |
|---|---|---|---|
| W-CDMA | W-CDMA | W-CDMA | Hand-over |
| W-CDMA | GSM | W-CDMA/GSM dual-mode | Hand-over |
| W-CDMA | Interference measurement | W-CDMA | Interference measurement |

| Terminal 1<br>First terminal control unit 5 | First measurement unit 7 | Second measurement unit 8 |
|---|---|---|
| W-CDMA | Power measurement | Modulation level measurement |

FIG. 11A

Terminal 1: Position registration | Call termination | Measurement 1 | Measurement 2 | Dis-connection | Position registration | Call termination | Measurement 1 | Measurement 2 | Dis-connection Terminal 2: Position registration | Call termination | Measurement 1 | Measurement 2 | Dis-connection | Position registration | Call termination | Measurement 1 | Measurement 2 | Dis-connection

FIG. 11B

Terminal 1: Position registration | Call termination | Measurement 1 | Measurement 2 | Dis-connection | Position registration | Call termination | Measurement 1 | Measurement 2 | Dis-connection Terminal 2: Position registration | Call termination | Measurement 1 | Measurement 2 | Dis-connection

FIG. 11C

Position registration | Call termination | Measurement 1 / Measurement 2 | Dis-connection

TEST APPARATUS AND METHOD WHICH CAN SIMULTANEOUSLY EXECUTE VARIOUS TESTS OF ONE OR A PLURALITY OF RADIO COMMUNICATION TERMINALS OF VARIOUS TYPES OF COMMUNICATION SYSTEMS

CROSS-REFERENCE TO RELATED APPLICATIONS

This application is based upon and claims the benefit of priority from prior Japanese Patent Application No. 2003-171058, filed Jun. 16, 2003, the entire contents of which are incorporated herein by reference.

BACKGROUND OF THE INVENTION

1. Field of the Invention

The present invention relates to a test apparatus and method which can comprehensively and simultaneously test the functions and performance of a plurality of radio communication terminals of various types of communication systems (e.g., W-CDMA, CDMA, GMS, PDC, PHS, and the like) and, more particularly, to a test apparatus and method for a radio communication terminal, which adopt a technique that can selectively execute simultaneous (parallel) measurement of a plurality of radio communication terminals of an identical type of communication system, simultaneous (parallel) measurement of a plurality of radio communication terminals of different type of communication systems, simultaneous (parallel) measurement of a plurality of different measurement items of at least one radio communication terminal having various types of communication systems, and the like.

2. Description of the Related Art

As conventional test apparatuses that test radio communication terminals of various types of communication systems, "Radio Communication Analyzer Suited for Measurement of Plurality of Types of Digital Communication Systems" disclosed in patent references 1 and 2 (U.S. Pat. Nos. 6,112,067 and 6,243,576) are known.

More specifically, in these test apparatuses, each of modulation means, demodulation means, analysis (measurement) means, and the like comprises hardware components such as a RAM that rewritably stores a program, a CPU that executes the program, and the like.

In these test apparatuses, programs suited to various types of communication systems are prepared. A program with the contents corresponding to the communication system of a radio communication terminal to be tested is imported to each rewritable RAM, and is executed by each CPU, thus testing many types of radio communication terminals by fewer hardware resources.

In the test apparatus of this type, various measurement and test items of a radio communication terminal to be tested must be tested, and are roughly classified into performance measurement items and functional test items.

As a conventional test apparatus which makes modulation accuracy measurement, adjacent channel leakage power measurement, occupied frequency bandwidth measurement, power measurement, frequency measurement, and the like as performance measurement items, Radio Communication Analyzer Having Collective Measurement Transmission Test Items" disclosed in patent reference 3 (U.S. Pat. No. 5,907,797) is known.

Note that functional test items include a call processing test that checks if a radio communication terminal to be tested can be connected and released between base stations within a predetermined standard range by a predetermined protocol.

Respective manufacturers who manufacture the aforementioned radio communication terminals (to be referred to as "terminals" hereinafter) such as a mobile station of various type of communication systems must reorganize manufacturing processes effective for terminals to be manufactured in accordance with market demands and technical progress (for example, according to patent references 1 and 2 above, communication systems of PDC, PHS, and GSM were mainstream, but CDMA-related communication systems were in a developmental stage back then).

To this end, the test apparatus which tests terminals of various types of communication systems is required to comprise test/measurement functions and arrangements that can cope with various reorganizations of the manufacturing processes.

Upon implementing the test/measurement functions and arrangements that can cope with such reorganization of the manufacturing process, it is important to cope with reorganization to have flexibility in terms of test resources, time, and manufacturing process organization.

In the aforementioned prior art, it is required to quickly test a plurality of terminals of an identical type of communication system, and to simultaneously test a plurality of measurement items.

Also, in the aforementioned prior arts, it is required to nearly simultaneously test a plurality of terminals of different type of radio communication systems, and to test a terminal which can make communication using a plurality of type of communication systems.

In such cases, since a radio communication terminal based on a cellular system must switch base stations when it roams, the terminal must undergo a hand-over test that tests this function using two test apparatuses.

In the prior art, upon conducting tests such as an interference measurement that generates an interference signal from test apparatuses to a radio communication terminal, and the like, it is required to prepare many test apparatuses, and to make measurements by combining these apparatuses.

Upon testing a radio communication terminal, in the call connection test, hand-over test, and the like, it is required to check if a response time or the like falls within a predetermined range specified by the standard.

However, since the prior art require many test apparatuses, much effort is required to adjust the control instruction timings and to synchronize these test apparatuses.

Therefore, the prior art do not consider any test system which can simultaneously execute various tests of one or a plurality of radio communication terminals of various type of communication systems, and it is difficult to provide a test apparatus which can effectively cope with various test patterns or various manufacturing processes required for terminals of various communication systems.

BRIEF SUMMARY OF THE INVENTION

It is an object of the present invention to provide a test apparatus and method for a radio communication terminal, which can simultaneously execute various tests of one or a plurality of radio communication terminals of various type of communication systems, and can cope with various organizations of test/manufacturing processes of terminals by improving the efficiency in terms of resources and test times for the types, measurement (test) items, and number of communication systems of radio communication terminals.

In order to realize an arrangement that can achieve the above object, the present invention aims at the following points.

A plurality of terminal control units and a plurality of measurement units are arranged in a single housing, and are independently controlled by a single total control unit so as to simultaneously measure terminals of various type of communication systems, a large number of terminals, and a large number of measurement items, and a single test apparatus can cope with a test which requires two test apparatuses for one terminal in the prior art.

The total control unit controls the plurality of terminal control units and the plurality of measurement units as independent components to download and execute test programs for control and measurement processes corresponding to various communication systems, so that a single test apparatus can quickly cope with a test of radio communication terminals of various type of communication systems.

The single total control unit is connected to the plurality of terminal control units and the plurality of measurement units via a common bus, and issues measurement control instructions via that common bus, thus solving conventional problems of timings, synchronization, and the like.

The total control unit controls the plurality of measurement units, and manages their measurement results together, thus displaying a plurality of pieces of control information and measurement results in accordance with the pattern of the manufacturing process.

More specifically, in order to achieve the above object, according to the first aspect of the present invention, there is provided a test apparatus for a radio communication terminal, comprising:

a single housing (100); and a test apparatus main body (101) mounted in the single housing, the test apparatus main body comprising:

a connection unit (17) to which at least two radio communication terminals (1, 2) of identical or different type of communication systems can be connected as objects to be tested;

a common bus (4);

first and second terminal control units (5, 6) which are parallelly connected between the common bus and the connection unit, and output test signals including signals that respectively control the at least two radio communication terminals which can be connected to the connection unit based on predetermined test programs according to the identical or different type of communication systems, and measurement instructions, which are supplied via the common bus;

first and second measurement units (7, 8) which are parallelly connected between the common bus and the connection unit, and respectively perform measurements designated by the measurement instructions upon reception of response signals which are output from the at least two radio communication terminals in response to the test signals from the first and second terminal control units; and a total control unit (9) which supplies, in advance, the predetermined test programs according to the type of communication systems of the at least two radio communication terminals and outputs the measurement instructions at predetermined timings to the first and second terminal control units.

According to the second aspect of the present invention, there is provided a test apparatus for a radio communication terminal according to the first aspect, wherein two radio communication terminals (1, 2) are connected to the connection unit, and the total control unit instructs the first and second terminal control units to control the first and second measurement units at timings at which the first and second measurement units can measure the response signals from the two radio communication terminals in different times.

According to the third aspect of the present invention, there is provided a test apparatus for a radio communication terminal according to the first aspect, wherein two radio communication terminals (1, 2) are connected to the connection unit, and the total control unit instructs the first and second terminal control units to control the first and second measurement units at timings at which the first and second measurement units can measure the response signals from the two radio communication terminals in different times, and instructs the first and second measurement units to parallelly perform measurements of first and second measurement items different from each other for at least one of the two radio communication terminals.

According to the fourth aspect of the present invention, there is provided a test apparatus for a radio communication terminal according to the first aspect, wherein one radio communication terminal (1) having of a predetermined type of communication system that allows a communication while roaming between a plurality of base stations is connected to the connection unit, and the total control unit controls the first and second terminal control units to load and execute predetermined test programs according to the predetermined type of communication system, controls the first terminal control unit to transmit a test signal as one base station simulator to the radio communication terminal, and controls the second terminal control unit to transmit a test signal as another base station simulator to the radio communication terminal so as to conduct a hand-over test.

According to the fifth aspect of the present invention, there is provided a test apparatus for a radio communication terminal according to the first aspect, wherein one radio communication terminal (1) having two different type of communication systems that allow a communication while roaming between two base stations of different type of communication systems is connected to the connection unit, and the total control unit controls the first and second terminal control units to load and execute predetermined test programs according to the different type of communication systems, controls the first terminal control unit to transmit a test signal as a base station simulator of one type of communication system to the radio communication terminal, and controls the second terminal control unit to transmit a test signal as a base station simulator of another type of communication system to the radio communication terminal so as to conduct a hand-over test between base station simulators of the different type of communication systems.

According to the sixth aspect of the present invention, there is provided a test apparatus for a radio communication terminal according to the first aspect, wherein at least one radio communication terminal (1) having two different type of communication systems is connected to the connection unit, the first and second terminal control units output test signals for controlling the radio communication terminal in accordance with the two different type of communication systems via the common bus, the first and second measurement units receive and measure response signals, which are output from the radio communication terminal in response to the test signals of the two different type of communication systems received from the first and second terminal control units, via the common bus, and the total control unit controls the first terminal unit and the first measurement unit to perform control and measurement processes of the radio communication terminal in accordance with one of the two different type of communication systems, and then controls the second terminal unit and the second measurement unit to perform control and measurement processes of the radio communication terminal in accordance with another of the two different type of communication systems.

According to the seventh aspect of the present invention, there is provided a test apparatus for a radio communication terminal according to the first aspect, further comprising a data processing section (12) which combines data measured by the first and second measurement units for each radio communication terminal.

According to the eighth aspect of the present invention, there is provided a test apparatus for a radio communication terminal according to the first aspect, wherein the total control unit has a function of implementing at least one of a. a first arrangement for, when the at least two radio communication terminals connected to the connection unit adopt an identical type of communication system, making the first and second terminal control units load and execute predetermined test programs corresponding to the identical type of communication system so as to control the first terminal control unit and the first measurement unit to perform control and measurement processes of one of the at least two radio communication terminals, and to control the second terminal control unit and the second measurement unit to perform control and measurement of another of the at least two radio communication terminals, b. a second arrangement for, when at least two radio communication terminals connected to the connection unit adopt different type of communication systems, making the first and second terminal control units respectively load and execute predetermined test programs corresponding to the different communication systems so as to control the first terminal control unit and the first measurement unit to perform control and measurement processes of one of the at least two radio communication terminals, and to control the second terminal control unit and the second measurement unit to perform control and measurement processes of another of the at least two radio communication terminals, c. a third arrangement for, when one radio communication terminal having two different type of communication systems is connected to the connection unit, making the first and second terminal control units respectively load and execute predetermined test programs corresponding to the two different type of communication systems so as to control the first terminal control unit and the first measurement unit to perform control and measurement processes of the radio communication terminal based on one of the two different type of communication systems, and to control the second terminal control unit and the second measurement unit to perform control and measurement processes of the radio communication terminal based on another the other of the two different communication systems.

According to the ninth aspect of the present invention, there is provided a test apparatus for a radio communication terminal according to the first aspect, wherein the total control unit has a function of implementing at least one of a. a first arrangement for, when the at least two radio communication terminals connected to the connection unit adopt an identical type of communication system, making the first and second terminal control units load and execute predetermined test programs corresponding to the identical type of communication system so as to control the first terminal control unit and the first measurement unit to perform control and measurement processes of one of the at least two radio communication terminals, and to control the second terminal control unit and the second measurement unit to perform control and measurement of another of the at least two radio communication terminals, b. a second arrangement for, when at least two radio communication terminals connected to the connection unit adopt different type of communication systems, making the first and second terminal control units respectively load and execute predetermined test programs corresponding to the different communication systems so as to control the first terminal control unit and the first measurement unit to perform control and measurement processes of one of the at least two radio communication terminals, and to control the second terminal control unit and the second measurement unit to perform control and measurement processes of another of the at least two radio communication terminals, c. a third arrangement for, when one radio communication terminal having two different type of communication systems is connected to the connection unit, making the first and second terminal control units respectively load and execute predetermined test programs corresponding to the two different type of communication systems so as to control the first terminal control unit and the first measurement unit to perform control and measurement processes of the radio communication terminal based on one of the two different type of communication systems, and to control the second terminal control unit and the second measurement unit to perform control and measurement processes of the radio communication terminal based on another of the two different type communication systems, and d. a fourth arrangement for, when one radio communication terminal of a predetermined type of communication system is connected to the connection unit, making the first terminal control unit load and execute a predetermined test program corresponding to the predetermined type of communication system, thereby to control the radio communication terminal and the first and second measurement units to simultaneously perform measurement processes of different functions or performance of the radio communication terminal.

According to the tenth aspect of the present invention, there is provided a test apparatus for a radio communication terminal according to the ninth aspect, wherein the total control unit has a function of selectively implementing, in addition to the arrangements a, b, c, and d, one of e. a fifth arrangement for, when one radio communication terminal of a predetermined type of communication system is connected to the connection unit, making the first terminal control unit transmit a test signal including an interference signal to the radio communication terminal, and making the second terminal control unit load and execute a predetermined test program corresponding to the predetermined type of communication system so as to control the radio communication terminal and to conduct an interference measurement based on a response from the radio communication terminal.

According to the eleventh aspect of the present invention, there is provided a test apparatus for a radio communication terminal according to the first aspect, wherein the total control unit further comprises a console (18), a display unit (15), a data memory (13) for storing measurement results measured by the first and second measurement units for the at least two radio communication terminals, and a display control section (14) for reading out the measurement results from the data memory upon reception of an instruction from the console, and displaying the readout measurement results on the display unit.

According to the twelfth aspect of the present invention, there is provided a test apparatus for a radio communication terminal according to the eleventh aspect, wherein the display control section selectively displays at least one of the measurement results of the at least two radio communication terminals and measurement conditions designated by measurement instructions upon reception of an instruction from the console.

According to the thirteenth aspect of the present invention, there is provided a test method for a radio communication terminal, comprising:

a) preparing a test apparatus main body (101) mounted in a single housing, the test apparatus main body comprising:

a connection unit (17) to which at least two radio communication terminals (1, 2) of identical or different type of communication systems can be connected;

a common bus (4);

first and second terminal control units (5, 6) which are connected between the common bus (4) and the connection unit (17);

first and second measurement units (7, 8) which are connected between the common bus (4) and the connection unit (17); and a total control unit (9) which is connected to the common bus (4) and stores predetermined test programs according to the identical or different type of communication systems and measurement instructions in an internal memory (10*a*), b) making the total control unit (9) supply, in advance, the predetermined test programs according to the identical or different type of communication systems of the at least two radio communication terminals (1, 2) and output the measurement instructions at predetermined timings to the first and second terminal control units (5, 6);

c) making the first and second terminal control units (5, 6) output test signals including signals that respectively control the at least two radio communication terminals (1, 2) which can be connected to the connection unit (17) based on predetermined test programs according to the identical or different type of communication systems, and measurement instructions, which are supplied via the common bus (4); and d) making the first and second measurement units (7, 8) perform measurements designated by the measurement instructions upon reception of response signals which are output from the at least two radio communication terminals (1, 2) in response to the test signals from the first and second terminal control units (5, 6).

According to the fourteenth aspect of the present invention, there is provided a test method for a radio communication terminal according to the thirteenth aspect, wherein two radio communication terminals (1, 2) are connected to the connection unit, and the total control unit instructs the first and second terminal control units to control the first and second measurement units at timings at which the first and second measurement units can measure the response signals from the two radio communication terminals in different times.

According to the fifteenth aspect of the present invention, there is provided a test method for a radio communication terminal according to the thirteenth aspect, wherein two radio communication terminals (1, 2) are connected to the connection unit, and the total control unit instructs the first and second terminal control units to control the first and second measurement units at timings at which the first and second measurement units can measure the response signals from the two radio communication terminals in different times, and instructs the first and second measurement units to parallelly perform measurements of first and second measurement items different from each other for at least one of the two radio communication terminals.

According to the sixteenth aspect of the present invention, there is provided a test method for a radio communication terminal according to the thirteenth aspect, wherein one radio communication terminal (1) of a predetermined type of communication system that allows a communication while roaming between a plurality of base stations is connected to the connection unit, and the total control unit controls the first and second terminal control units to load and execute predetermined test programs according to the predetermined type of communication system, controls the first terminal control unit to transmit a test signal as one base station simulator to the radio communication terminal, and controls the second terminal control unit to transmit a test signal as another base station simulator to the radio communication terminal so as to conduct a hand-over test.

According to the seventeenth aspect of the present invention, there is provided a test method for a radio communication terminal according to the thirteenth aspect, wherein one radio communication terminal (1) having two different type of communication systems that allow a communication while roaming between two base stations of the different type of communication systems is connected to the connection unit, and the total control unit controls the first and second terminal control units to load and execute predetermined test programs according to the different type of communication systems, controls the first terminal control unit to transmit a test signal as a base station simulator of one type of communication system to the radio communication terminal, and controls the second terminal control unit to transmit a test signal as a base station simulator of another type of communication system to the radio communication terminal so as to conduct a hand-over test between two base station simulators of the different type of communication systems.

According to the eighteenth aspect of the present invention, there is provided a test method for a radio communication terminal according to the thirteenth aspect, wherein at least one radio communication terminal (1) having two different type of communication systems is connected to the connection unit, the first and second terminal control units output test signals for controlling the radio communication terminal in accordance with the two different type of communication systems via the common bus, the first and second measurement units receive and measure response signals, which are output from the radio communication terminal in response to the test signals of the two different type of communication systems received from the first and second terminal control units, via the common bus, and the total control unit controls the first terminal unit and the first measurement unit to perform control and measurement processes of the radio communication terminal in accordance with one of the two different type of communication systems, and then controls the second terminal unit and the second measurement unit to perform control and measurement processes of the radio communication terminal in accordance with another of the two different type of communication systems.

According to the nineteenth aspect of the present invention, there is provided a test method for a radio communication terminal according to the thirteenth aspect, further comprising preparing a data processing section (12), and wherein the data processing section (12) combines data measured by the first and second measurement units for each radio communication terminal.

According to the twentieth aspect of the present invention, there is provided a test method for a radio communication terminal according to the thirteenth aspect, wherein the total control unit has a function of implementing at least one of a. a first arrangement for, when the at least two radio communication terminals connected to the connection unit adopt an identical type of communication system, making the first and second terminal control units load and execute predetermined test programs corresponding to the identical type of communication system so as to control the first terminal control unit and the first measurement unit to perform control and measurement processes of one of the at least two radio communication terminals, and to control the second terminal control unit and the second measurement unit to perform control and measurement of another of the at least two radio communication terminals, b. a second arrangement for, when at least two radio communication terminals connected to the connection unit adopt different type of communication systems, making the first and second terminal control units respectively load and execute predetermined test programs corresponding to the different type of communication systems so as to control the first terminal control unit and the first measurement unit to perform control and measurement processes of one of the at least two radio communication terminals, and to control the second terminal control unit and the second measurement unit to perform control and measurement processes of another of the at least two radio communication terminals, and c. a third arrangement for, when one radio communication terminal having two different type of communication systems is connected to the connection unit, making the first and second terminal control units respectively load and execute predetermined test programs corresponding to the two different type of communication systems so as to control the first terminal control unit and the first measurement unit to perform control and measurement processes of the radio communication terminal based on one of the two different type of communication systems, and to control the second terminal control unit and the second measurement unit to perform control and measurement processes of the radio communication terminal based on another of the two different type of communication systems.

According to the twenty-first aspect of the present invention, there is provided a test method for a radio communication terminal according to the thirteenth aspect, wherein the total control unit has a function of implementing at least one of a. a first arrangement for, when the at least two radio communication terminals connected to the connection unit adopt an identical type of communication system, making the first and second terminal control units load and execute predetermined test programs corresponding to the identical type of communication system so as to control the first terminal control unit and the first measurement unit to perform control and measurement processes of one of the at least two radio communication terminals, and to control the second terminal control unit and the second measurement unit to perform control and measurement of another of the at least two radio communication terminals, b. a second arrangement for, when at least two radio communication terminals connected to the connection unit adopt different type of communication systems, making the first and second terminal control units respectively load and execute predetermined test programs corresponding to the different type of communication systems so as to control the first terminal control unit and the first measurement unit to perform control and measurement processes of one of the at least two radio communication terminals, and to control the second terminal control unit and the second measurement unit to perform control and measurement processes of another of the at least two radio communication terminals, c. a third arrangement for, when one radio communication terminal having two different type of communication systems is connected to the connection unit, making the first and second terminal control units respectively load and execute predetermined test programs corresponding to the two different type of communication systems so as to control the first terminal control unit and the first measurement unit to perform control and measurement processes of the radio communication terminal based on one of the two different type of communication systems, and to control the second terminal control unit and the second measurement unit to perform control and measurement processes of the radio communication terminal based on another of the two different type of communication systems, and d. a fourth arrangement for, when one radio communication terminal of a predetermined type of communication system is connected to the connection unit, making the first terminal control unit load and execute a predetermined test program corresponding to the predetermined type of communication system, thereby to control the radio communication terminal and the first and second measurement units to simultaneously perform measurement processes of functions or performance of the radio communication terminal.

According to the twenty-second aspect of the present invention, there is provided a test method for a radio communication terminal according to the twenty-first aspect, wherein the total control unit has a function of selectively implementing, in addition to the arrangements a, b, c, and d, one of e. a fifth arrangement for, when one radio communication terminal of a predetermined type of communication system is connected to the connection unit, making the first terminal control unit transmit a test signal including an interference signal to the radio communication terminal, and making the second terminal control unit load and execute a predetermined test program corresponding to the predetermined type of communication system so as to control the radio communication terminal and to conduct an interference test based on a response from the radio communication terminal.

According to the twenty-third aspect of the present invention, there is provided a test method for a radio communication terminal according to the thirteenth aspect, wherein the total control unit further comprises a console (18), a display unit (15), a data memory (13) for storing measurement results measured by the first and second measurement units for the at least two radio communication terminals, and a display control section (14) for reading out the measurement results from the data memory upon reception of an instruction from the console, and displaying the readout measurement results on the display unit.

According to the twenty-fourth aspect of the present invention, there is provided a test method for a radio communication terminal according to the twenty-third aspect, wherein the display control section selectively displays at least one of the measurement results of the at least two radio communication terminals and measurement conditions designated by measurement instructions upon reception of an instruction from the console.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a functional block diagram of a test apparatus which is mounted in a single housing as an embodiment of a test apparatus for a radio communication terminal according to the present invention;

FIGS. 11A, 11B, and 11C are timing charts for explaining various test/measurement timings made by the test apparatus for a radio communication terminal according to the present invention.

DETAILED DESCRIPTION OF THE INVENTION

Figure 2:
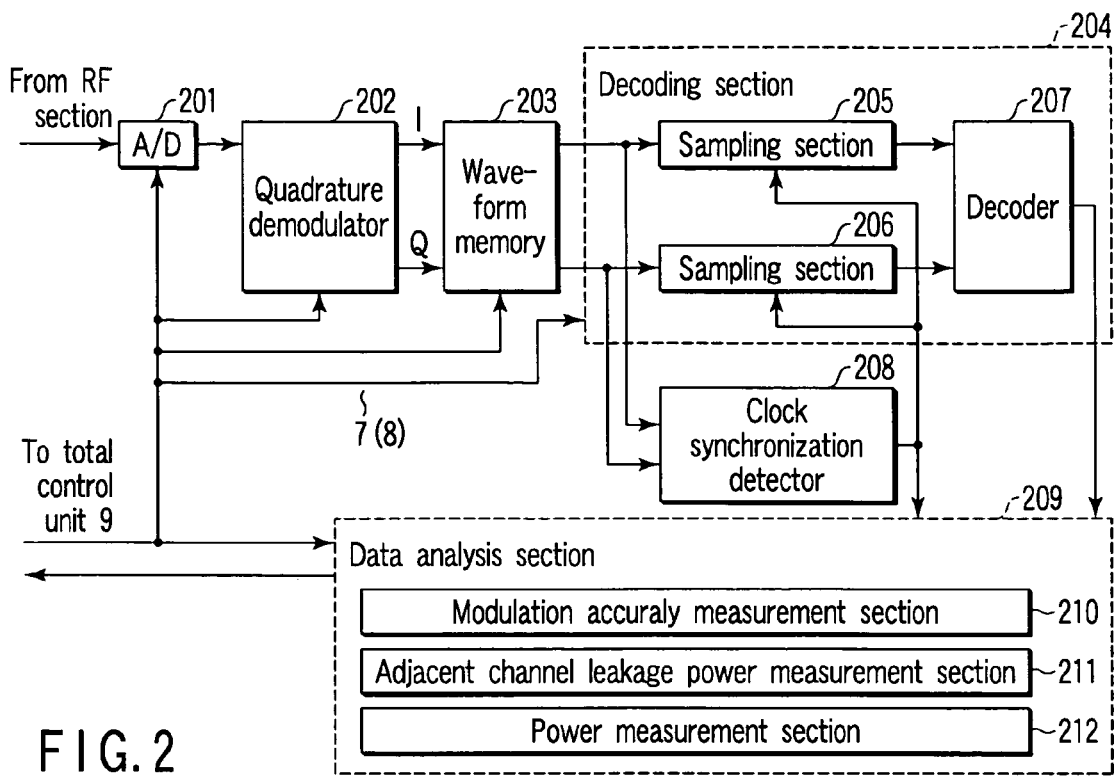
FIG. 2 is a functional block diagram for explaining the arrangement of a measurement unit shown in FIG. 1.

Reference will now be made in detail to the presently preferred embodiments of the invention as illustrated in the accompanying drawings, in which like reference numerals designate like or corresponding parts.

FIG. 1 is a functional block diagram showing the arrangement of a test apparatus main body 101, which mounts, in a single housing 100, a connection unit 17, common bus 4, switch unit 3, first and second terminal control units 5 and 6, and first and second measurement units 7 and 8, as an embodiment of a test apparatus which can simultaneously test a plurality of radio communication terminals 1 and 2 of various type of communication systems according to the present invention.

That is, this test apparatus main body 101 comprises the connection unit 17, common bus 4, switch unit 3, first and second terminal control units 5 and 6, first and second measurement units 7 and 8, and a total control unit 9. The connection unit 17 can connect at least two radio communication terminals 1 and 2 of identical or different type of communication systems as objects to be tested. The first and second terminal control units 5 and 6 are respectively connected between the common bus and connection unit 17 via the switch unit 3 and output test signals including signals for respectively controlling the at least two radio communication terminals 1 and 2, which can be connected to the connection unit 17, based on predetermined control/test programs and measurement instructions according to the identical or different type of communication systems, which are supplied via the common bus 4. The first and second measurement units 7 and 8 are respectively connected between the common bus and connection unit 17 via the switch unit 3, and make measurements designated by the measurement instructions in response to response signals from the at least two radio communication terminals 1 and 2 which have responded to the test signals from the first and second terminal control units 5 and 6. The total control unit 9 supplies the predetermined control/test programs according to the type of communication systems of the at least two radio communication terminals 1 and 2 to the first and second terminal control units 5 and 6 in advance, and outputs the measurement instructions at predetermined timings.

Referring to FIG. 1, the terminals 1 and 2 are radio communication terminals to be tested, and comprise, e.g., portable phones, which are connected to the connection unit 17 of the test apparatus 101.

FIG. 1 illustrates a case wherein the two terminals 1 and 2 are connected as the radio communication terminals to be tested. However, the test apparatus 101 can also be configured to be able to test two or more terminals or one terminal.

In the present invention, as for communication systems of these terminals to be tested, terminals of various type of communication systems such as W-CDMA, GSM, CDMA2000, PDC, PHS, and the like can be used as those to be tested.

Figures 8, 9:
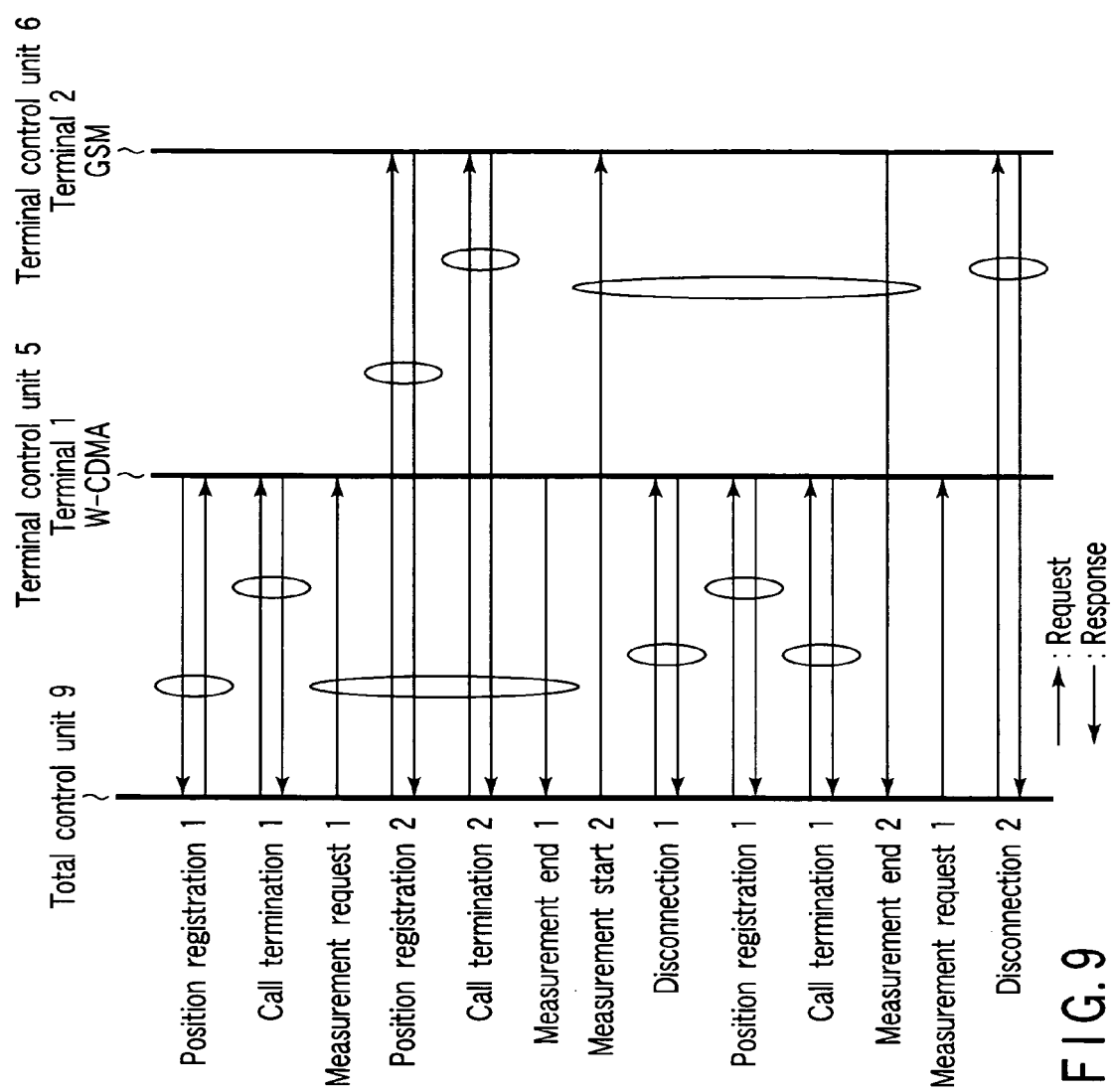
FIG. 8 is a table for explaining combinations of type of communication systems upon independently testing two radio communication terminals by the test apparatus for a radio communication terminal according to the present invention.
FIG. 9 is a chart for explaining the flow of control and measurement required to test a dual-mode radio communication terminal by the test apparatus for a radio communication terminal according to the present invention.

As combinations of type of communication systems upon testing the two terminals 1 and 2 in the test apparatus 101 according to the present invention, for example, two terminals of identical or different type of communication systems of the above communication systems of W-CDMA, GSM, CDMA2000, PDC, and PHS can be combined as the terminals 1 and 2 to be tested, as shown in FIG. 8.

In FIG. 8, as five examples of combinations of two terminals of an identical type of communication system, when the terminal 1 adopts W-CDMA, GSM, CDMA2000, PDC, or PHS, the terminal 2 can adopt W-CDMA, GSM, CDMA2000, PDC, or PHS.

Also, FIG. 8 shows four examples of combinations of two terminals of different type of communication systems, in which when the terminal 1 adopts W-CDMA, the terminal 2 adopts GSM, PDC, PHS, or CDMA2000.

Furthermore, FIG. 8 shows four examples of combinations of two terminals of different type of communication systems, in which when the terminal 1 adopts GSM, the terminal 2 adopts W-CDMA, PDC, PHS, or CDMA2000.

Moreover, FIG. 8 shows two examples of combinations of two terminals of different type of communication systems, in which when the terminal 1 adopts CDMA2000, the terminal 2 adopts PDC or PHS.

In addition, FIG. 8 shows one example of combinations of two terminals of different type of communication systems, in which when the terminal 1 adopts PDC, the terminal 2 adopts PHS.

Referring back to FIG. 1, in the test apparatus 101 according to the present invention, the first and second terminal control units 5 and 6 play the role of base station simulators for the terminals 1 and 2. The first and second terminal control units 5 and 6 have the same hardware arrangement, and each unit comprises a RAM and CPU.

The terminal control units 5 and 6 receive programs required to control and test the terminals 1 and 2 to be tested from the total control unit 9 in accordance with their type of communication systems, store the received programs in the RAMs, and execute the programs by the CPUs, thus sending test signals according to the type of communication systems to the two terminals 1 and 2.

As for these first and second terminal control units 5 and 6, technical items described in patent reference 1 above can be quoted as needed.

Test signal generators 5a and 6a in the first and second terminal control units 5 and 6 generate baseband signals I(t) and Q(t) based on predetermined internal clocks, and output these baseband signals, which include control information required for the first and second terminal control units 5 and 6 to serve as base station simulators for the two terminals 1 and 2.

The control information includes instructions required for "position registration", "call termination" or "origination", and "disconnection" or "release" tests, and other tests, which are exchanged between the two terminals 1 and 2 and their base station simulators.

RF sections 5b and 6b in the first and second terminal control units 5 and 6 send test signals which are obtained by modulating the baseband signals from the test signal generators 5a and 6a into the same frequencies as those of the type of communication systems of the two terminals 1 and 2 to the two terminals 1 and 2. Also, the RF sections 5b and 6b receive response signals from the two terminals 1 and 2 which received these test signals, and send them to the first and second measurement units 7 and 8.

Figure 3:
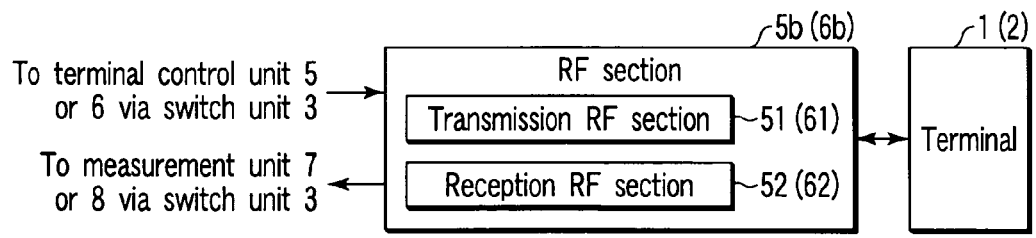
FIG. 3 is a block diagram for explaining the arrangement of an RF section in a terminal control unit shown in FIG. 1.

Therefore, as shown in FIG. 3, the RF sections 5b and 6b respectively comprise transmission RF sections 51 and 61 and reception RF sections 52 and 62 to transmit RF-band test signals to the two terminals 1 and 2, and to receive response signals from the two terminals 1 and 2.

Note that FIG. 1 illustrates a case wherein the RF sections 5b and 6b are present on the side of the test signal generators 5a and 6a in the first and second terminal control units 5 and 6, but may be present on the side of the two terminals 1 and 2 in the switch unit 3.

Each of the first and second measurement units 7 and 8 receives an IF (intermediate frequency) signal from the RF section (5b, 6b), converts the IF signal into a digital signal by an analog-to-digital (A/D) converter 201, demodulates the digital signal by a quadrature demodulator 202 to convert it into signals I(t) and Q(t), and stores them in a waveform memory 203, as shown in FIG. 2 that shows one of these units.

In each of these first and second measurement units 7 and 8, a decoder 207 decodes the signals I(t) and Q(t) from the waveform memory 203 via sampling sections 205 and 206 that form a decoding section 204, and a clock synchronization detector 208 detects clock synchronization.

Also, in each of these first and second measurement units 7 and 8, a data analysis section 209 performs data analysis for measurement of the decoded signal, which is decoded by the decoder 207, based on the clock synchronization detection signal from the clock synchronization detector 208.

FIG. 2 exemplifies a case wherein the data analysis section 209 comprises a modulation accuracy measurement section 210, adjacent channel leakage power measurement section 211, and power measurement section 212 to make a modulation accuracy measurement, adjacent channel leakage power measurement, and power measurement.

As for these first and second measurement units 7 and 8, technical items described in patent reference 3 above can be quoted as needed.

Referring back to FIG. 1, the switch unit 3 has switches S1, S2, S3, and S4, and illustrates switching processes required to change combinations in correspondence with the number of terminals, types of communication systems, measurement items, measurement methods, or the like upon testing terminals between the first and second terminal control units 5 and 6, first and second measurement units 7 and 8, and connection unit 17 to which the two terminals 1 and 2 are connected.

The switch unit 3 may switch the switches S1, S2, S3, and S4 in accordance with instructions from a measurement control section 11 in the total control unit 9 (to be described later), as shown in FIG. 1, or may manually switch connections to some units, e.g., the RF sections.

This is because once a manufacturing line or the like is set to start testing of terminals, the test is continued in an identical setting state, and the switches S1, S2, S3, and S4 need not be automatically switched.

For this reason, it is often convenient that some switches of the switch unit 3 are arranged on the side of the terminals 1 and 2 rather than the connection unit 17.

The total control unit 9 comprises a program management section 10, measurement control section 11, data processing section 12, and display control section 14, which are functionally implemented by a CPU.

The program management section 10 pre-stores, in a memory 10a, programs required for the first and second terminal control units 5 and 6 to control and test in correspondence with the type of communication systems of the two terminals 1 and 2, and outputs required programs from the memory 10*a* in accordance with instructions from the measurement control section 11.

Note that the program management section 10 can externally receive new programs or programs whose versions have been updated, and can add and update the programs on the memory 10*a*.

Note that the first and second measurement units 7 and 8 receive programs, which are prepared in advance, from the memory 10*a*, when their decoding methods differ depending on the type of communication systems.

The measurement control section 11 reads out programs required to control and test in correspondence with the type of communication systems of the two terminals 1 and 2 from the memory 10*a*, and supplies them to the first and second terminal control units 5 and 6 via the common bus 4. Also, the measurement control section 11 controls the first and second terminal control units 5 and 6, and the first and second measurement units 7 and 8 via the common bus 4 in accordance with measurement (test) items.

The first and second measurement units 7 and 8, and first and second terminal control units 5 and 6 are connected to the common bus 4.

Especially, a call termination test, hand-over test, and the like (to be described later) which are conducted using the test apparatus 101 of the present invention are conducted within a very short period of time, and response times at that time are one of test items. Hence, the first and second measurement units 7 and 8, and first and second terminal control units 5 and 6 must be synchronously operated via the common bus 4.

The present invention can bring about, as its feature, very easy and accurate time control of the measurement control section 11 of the total control unit 9, since the first and second terminal control units 5 and 6 and first and second measurement units 7 and 8 can be simultaneously handled via the common bus upon handling the plurality of terminals 1 and 2.

Figure 4:
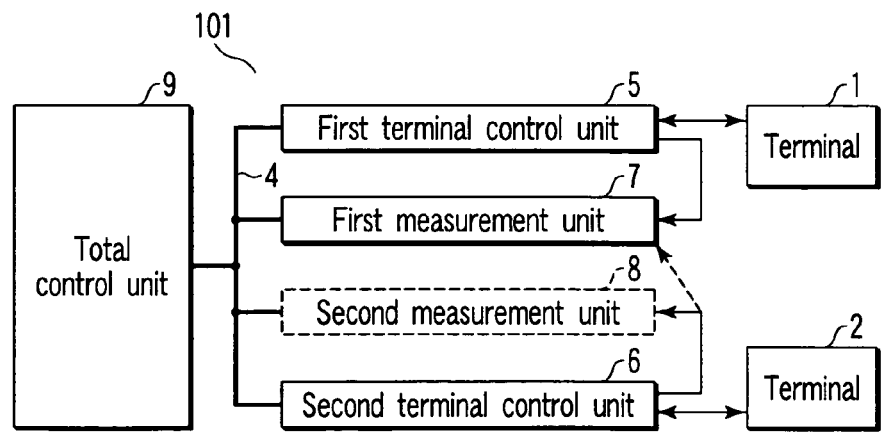
FIG. 4 is a block diagram for explaining the arrangement, a type of communication system, and the like of principal part required to independently and simultaneously (parallelly) test two radio communication terminals by the test apparatus for a radio communication terminal according to the present invention.

Since the aforementioned arrangement is adopted, when the terminals 1 and 2 of various type of communication systems are to be tested in combinations shown in, e.g., FIG. 8, the measurement control section 11 of the total control unit 9 can independently and parallelly control the first and second terminal control units 5 and 6 and first and second measurement units 7 and 8, as shown in FIG. 4, independently of whether the two terminals 1 and 2 adopt the identical or different type of communication systems.

Even when a single terminal is to undergo control and measurement by the test apparatus for a radio communication terminal according to the present invention, as shown in FIGS. 5A and 5B, FIGS. 6A and 6B, and FIGS. 7A and 7B (to be described later), such control and measurement can be made while synchronizing the first and second terminal control units 5 and 6 and first and second measurement units 7 and 8. Therefore, measurement errors due to timing errors can be prevented. Also, since the measurement control section 11 of the total control unit 9 solely issues instructions, timing errors due to instructions themselves can be prevented.

The measurement control section 11 of the total control unit 9 also checks a test result by comparing and measuring its instruction timing, and response timings of the terminals 1 and 2 during a call termination test, hand-over test, or the like.

Note that the measurement control section 11 of the total control unit 9 pre-stores measurement control programs that execute measurement items and measurement sequences based on various type of communication systems, their combinations, and the like. When the CPU of the total control unit 9 executes such programs, the measurement control section 11 controls the respective units.

The data processing section 12 of the total control unit 9 processes and manages data measured by the measurement units 7 and 8, and stores them in a data memory 13.

Especially when the terminal 1 operates in a dual mode of, e.g., W-CDMA and GSM, the first terminal control unit 5 and first measurement unit 7 serve as a base station simulator corresponding to W-CDMA, the second terminal control unit 6 and second measurement unit 8 serve as a base station simulator corresponding to GSM, their measurement processes to be made are switched at timings designated by instructions from the measurement control unit 11, and so forth, the data processing section 12 manages data measured by the first and second measurement units 7 and 8 together as data of the terminal 1.

The display control section 14 of the total control unit 9 receives instructions from the measurement control unit 11, and displays to guide measurement items, measurement sequences, operations, and the like. Also, the display control section 14 displays a data format, and displays measured data.

Note that an external interface 16 provided in the test apparatus main body 101 is used to externally control the test apparatus main body 101.

As described above, this external interface 16 is connected to the measurement control section 11 which simultaneously controls the plurality of terminal control units 5 and 6 and measurement units 7 and 8.

For this reason, since an external apparatus connected to the test apparatus main body 101 can control these units via a single interface, it is more convenient than in a case wherein a plurality of test apparatuses are to be controlled while synchronizing their timings as in the prior arts.

A display unit 15 provided in the test apparatus main body 101 is connected to the display control section 14 of the total control unit 9, and displays the measurement results of the test apparatus main body 101 and control information as measurement instructions in correspondence with the terminals 1 and 2.

Note that the measurement results of the test apparatus main body 101 are stored in the data memory 13 in correspondence with the terminals 1 and 2.

The display control section 14 reads out the measurement results of the test apparatus main body 101 from the data memory 13 upon reception of an instruction from a console 18 (including operation buttons and the like on a surface panel) provided in the test apparatus main body 101, and makes control to display them on the display unit 15, thus displaying the measurement results on the display unit 15.

Also, control information for tests by the test apparatus main body 101 is displayed on the display unit 15 in the same manner as the aforementioned measurement results.

That is, the display control section 14 receives control information for measurements from the measurement control section 11, and controls the display unit 15 to display data of the selected terminal.

The display control section 14 receives a setup which is made at the console 18, and indicates whether to display the measurement results or control information, and controls the display unit 15 to display the corresponding data.

Note that the display control section 14 can control the display unit 15 to display control information at the beginning of measurements of the selected terminal, and to display the measurement results upon completion of the measurements.

Furthermore, the display control section can control the display unit 15 to display control information of the selected terminal, and to display the measurement results in turn from an item that has undergone the measurement as needed from the beginning of the measurements.

The test apparatus for a radio communication terminal according to the present invention has a function of simultaneously (parallelly) measuring two terminals by a single apparatus, and allowing arbitrary selection of data to be displayed, since the total control unit 9 simultaneously manages measurement information, measurement values, and display data of the two terminals.

In the test apparatus main body 101, the total control unit 9 has a function of implementing at least one of the following arrangements a, b, and c:

a. a first arrangement for, when at least two terminals 1 and 2 connected to the connection unit 17 adopt an identical type of communication system, making the first and second terminal control units 5 and 6 load and execute a program for a predetermined test corresponding to the identical type of communication system so as to control the first terminal control unit 5 and first measurement unit 7 to perform control and measurement processes of at least one terminal, and to control the second terminal control unit 6 and second measurement unit 8 to perform control and measurement processes of at least another terminal;

b. a second arrangement for, when at least two terminals 1 and 2 connected to the connection unit 17 adopt different type of communication systems, making the first and second terminal control units 5 and 6 respectively load and execute programs for predetermined tests corresponding to the different type of communication systems so as to control the first terminal control unit 5 and first measurement unit 7 to perform control and measurement processes of at least one terminal, and to control the second terminal control unit 6 and second measurement unit 8 to perform control and measurement processes of at least another terminal; and c. a third arrangement for, when one terminal 1 having two different type of communication systems is connected to the connection unit 17, making the first and second terminal control units 5 and 6 respectively load and execute programs for predetermined tests corresponding to the two different type of communication systems so as to control the first terminal control unit 5 and first measurement unit 7 to perform control and measurement processes of the terminal 1 based on one type of communication system, and to control the second terminal control unit 6 and second measurement unit 8 to perform control and measurement processes of the terminal 1 based on another type of communication system.

In the test apparatus main body 101, the total control unit 9 has a function of selectively implementing the following arrangement d in addition to the aforementioned arrangements a, b, and c:

d. a fourth arrangement for, when one terminal 1 of a predetermined communication system is connected to the connection unit 17, making the first terminal control unit 5 load and execute a program for a predetermined test corresponding to the predetermined type of communication system, so as to control the terminal 1 and to control the first and second measurement units 7 and 8 to simultaneously measure different functions or performance data of the terminal 1.

In the test apparatus main body 101, the total control unit 9 has a function of selectively implementing the following arrangement e in addition to the aforementioned arrangements a, b, c, and d:

e. a fifth arrangement for, when one terminal 1 of a predetermined type of communication system is connected to the connection unit 17, making the first terminal control unit 5 transmit a test signal including an interference signal to the terminal 1, and making the second terminal control unit 6 load and execute a predetermined test program corresponding to the predetermined type of communication system so as to control the terminal 1 and to conduct an interference measurement based on a response from the terminal to the control.

Practical embodiments 1 to 4 of tests of various terminals, which are conducted using the text apparatus for a radio communication terminal according to the present invention with the above arrangement will be described below.

<Embodiment 1: Independent Parallel Test of a Plurality of Terminals>

FIG. 4 is a diagram showing components, which are extracted from FIG. 1 and are required to independently and parallelly test the two terminals 1 and 2 to be tested, as embodiment 1 that tests terminals using the test apparatus for a radio communication terminal according to the present invention.

As combinations of the type of communication systems of the two terminals 1 and 2 to be tested by this arrangement, those shown in FIG. 8 above are available.

In this case, the total control unit 9 is connected to the first and second terminal control units 5 and 6 and first and second measurement units 7 and 8 via the common bus 4.

Note that the first and second terminal control units 5 and 6 are connected in correspondence with the two terminals 1 and 2 via the switch unit 3 and connection unit 17 (FIG. 1).

The first and second terminal control units 5 and 6 output test signals including signals required to independently and parallelly control the two terminals 1 and 2.

The first and second measurement units 7 and 8 receive response signals, which are respectively output from the two terminals 1 and 2 in response to the test signals received from the first and second terminal control units 5 and 6, via the first and second terminal control units 5 and 6. Also, the first and second measurement units 7 and 8 independently and parallelly perform predetermined measurements 1 and 2 for the two terminals 1 and 2 for respective measurements 1 and 2 based on the response signals.

The total control unit 9 controls the first terminal control unit 5 and first measurement unit 7 via the common bus 4 (FIG. 1) to perform predetermined control and measurement for one terminal 1 in accordance with a predetermined type of communication system. At the same time, the total control unit 9 independently controls the second terminal control unit 6 and second measurement unit 8 via the common bus 4 to perform predetermined control and measurement for the other terminal 2 in accordance with a predetermined communication system.

In FIG. 4, the total control unit 9 makes the first and second terminal control units 5 and 6, and the first and second measurement units 7 and 8 (if necessary) load and execute programs for terminal tests corresponding to the type of communication systems of the two terminals 1 and 2, as one of combinations of communication systems shown in FIG. 8.

In FIG. 4, the first and second terminal control units 5 and 6, and first and second measurement units 7 and 8 are independent from each other to support various combinations of identical or different communication systems of the two terminals 1 and 2, as shown in FIG. 8.

FIGS. 11A and 11B show timings for explaining control and measurements by the test apparatus for a radio communication terminal with the arrangement shown in FIG. 4.

In this case, the total control unit 9 controls the first and second terminal control units 5 and 6 to transmit test signals, which include control instructions that are repeated in the order of "position registration", "call termination", "measurement 1", "measurement 2", and "disconnection", to the terminals 1 and 2, and controls the terminals 1 and 2 to conduct "position registration", "call termination", "measurement 1", "measurement 2", and "disconnection" tests.

FIG. 11A is a timing chart upon parallely testing the terminals 1 and 2, and the "position registration", "call termination", "measurement 1", "measurement 2", and "disconnection (communication disconnection)" tests are executed in turn.

In FIG. 4, the dotted arrow from the second terminal control unit 6 to the first measurement unit 7 indicates an arrangement when the second measurement unit 8 indicated by the dotted frame is excluded, and the first measurement unit 7 is time-shared for the two systems of the terminals 1 and 2.

FIG. 11B is a timing chart when the measurement unit 7 is time-shared for the two systems of the terminals 1 and 2 in this way.

As shown in FIG. 11B, the total control unit 9 controls each of the terminals 1 and 2 to execute "position registration", "call termination", "measurement 1", "measurement 2", and "disconnection" tests while adjusting the timings so as to prevent measurement times from overlapping.

That is, the total control unit 9 instructs the first and second control units 5 and 6 to control at timings at which the first and second measurement units 7 and 8 can measure response signals from the two terminals 1 and 2 in different times.

FIG. 9 is a chart for explaining the control of the total control unit 9 in this case and the relationship of responses from the terminals 1 and 2 via the first and second terminal control units 5 and 6 in response to that control.

In FIG. 9, the communication system of one terminal 1 is W-CDMA, and that of the other terminal 2 is GSM. Each rightward arrow indicates a request, and each leftward arrow indicates a response.

When the total control unit 9 sends a "position registration 1" request to one terminal 1, the terminal 1 outputs a "position registration 1" response to the total control unit 9.

When the total control unit 9 sends a "call termination 1" request to one terminal 1, the terminal 1 outputs a "call termination 1" response to the total control unit 9.

When the total control unit 9 sends a "position registration 2" request to the other terminal 2, the terminal 2 outputs a "position registration 2" response to the total control unit 9.

In this case, the total control unit 9 outputs a "measurement 1 start" request to one terminal 1 prior to the "position registration 2" request from the total control unit 9 to the other terminal 2.

When the total control unit 9 sends a "call termination 2" request to the other terminal 2, the terminal 2 outputs a "call termination 2" response to the total control unit 9.

One terminal 1 outputs a "measurement 1 end" response to the total control unit 9.

The total control unit 9 outputs a "measurement 2 start" request to the other terminal 2.

When the total control unit 9 sends a "disconnection 1" request to one terminal 1, the terminal 1 outputs a "disconnection 1" response to the total control unit 9.

When the total control unit 9 sends a "position registration 1" request to one terminal 1 again, the terminal 1 outputs a "position registration 1" response to the total control unit 9.

When the total control unit 9 sends a "call termination 1" request to one terminal 1 again, the terminal 1 outputs a "call termination 1" response to the total control unit 9.

The other terminal 2 outputs a "measurement 2 end" response to the total control unit 9.

The total control unit 9 outputs a "measurement 1 start" request to one terminal 1 again.

When the total control unit 9 sends a "disconnection 2" request to the other terminal 2, the terminal 2 outputs a "disconnection 2" response to the total control unit 9.

After that, the same requests and responses as above are exchanged in the order of "position registration 2", "call termination 2", . . .

As described above, as can be understood from FIG. 9, respective test (measurement) instructions from the total control unit 9 are controlled to have timings that can prevent measurement times of the two terminals from overlapping each other.

As for these timings, timing errors become larger with the elapse of time and pose problems, unless the terminal control units 5 and 6 and measurement units 7 and 8 are accurately synchronized, and respective test (measurement) instructions are issued from only one unit.

The arrangement of the present invention can overcome such problems of timing errors.

As described above, the single test apparatus for a radio communication terminal according to the present invention can independently and simultaneously (parallely) execute tests for the two terminals 1 and 2.

<Embodiment 2: Tests of Dual-mode Terminal>

Figures 5A, 5B:
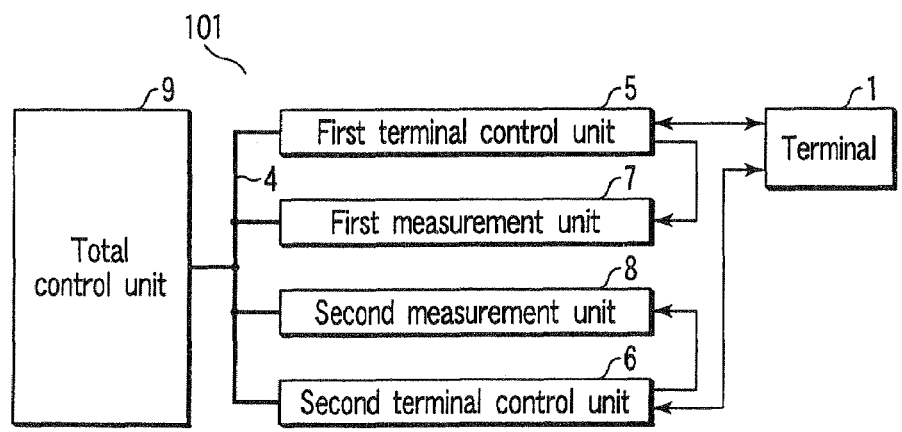
FIGS. 5A and 5B are respectively a block diagram and table for explaining the arrangement, a type of communication system, and the like of principal part required to test a dual-mode radio communication terminal by the test apparatus for a radio communication terminal according to the present invention.

FIG. 5A is a diagram showing components, which are extracted from FIG. 1, and are required as an arrangement of the test apparatus when the terminal 1 to be tested is a dual-mode terminal having functions of two different type of communication systems, i.e., W-CDMA and GSM, as a single portable phone, as shown in FIG. 5B, as embodiment 2 of tests for a terminal, which are conducted using the single test apparatus for a radio communication terminal according to the present invention.

In this case, the total control unit 9 is connected to the first and second terminal control units 5 and 6 and first and second measurement units 7 and 8 via the common bus 4.

Note that the first and second terminal control units 5 and 6 are connected to at least one terminal 1 having two different type of communication systems via the switch unit 3 and connection unit 17 (FIG. 1).

The first and second terminal control units 5 and 6 output test signals including signals required to control the terminal 1 in accordance with the two different type of communication systems.

The first and second measurement units 7 and 8 receive response signals, which are respectively output from the terminal 1 in response to the test signals of the two different type of communication systems received from the first and second terminal control units 5 and 6, via the first and second terminal control units 5 and 6. Also, the first and second measurement units 7 and 8 perform predetermined measurements based on the response signals.

The total control unit 9 controls the first terminal control unit 5 and first measurement unit 7 via the common bus 4 (FIG. 1) to perform predetermined control and measurement for the terminal 1 in accordance with one of the two different type of communication systems. After that, the total control unit 9 controls the second terminal control unit 6 and second measurement unit 8 via the common bus 4 to perform predetermined control and measurement in accordance with another type of communication system.

More specifically, the total control unit 9 controls the first terminal control unit 5 and first measurement unit 7 to serve as a base station simulator of the W-CDMA type of communication system and controls the second terminal control unit 6 and second measurement unit 8 to serve as a base station simulator of the GSM type of communication system by loading programs for dual-mode terminal tests corresponding to the type of communication systems of the W-CDMA & GSM dual-mode terminal 1 to be tested.

The total control unit 9 controls the first terminal control unit 5, first measurement unit 7, and terminal 1 to execute operations and measurements in the W-CDMA mode by the terminal 1 by issuing a position registration control instruction and the like.

After that, the total control unit 9 controls the second terminal control unit 6, second measurement unit 8, and terminal 2 to execute operations and measurements in the GSM type of communication system mode by the terminal 1.

In this way, the single test apparatus for a radio communication terminal according to the present invention can execute tests of the dual-mode terminal.

<Embodiment 3: Hand-over Test and Interference Test of One Terminal>

Figures 6A, 6B:
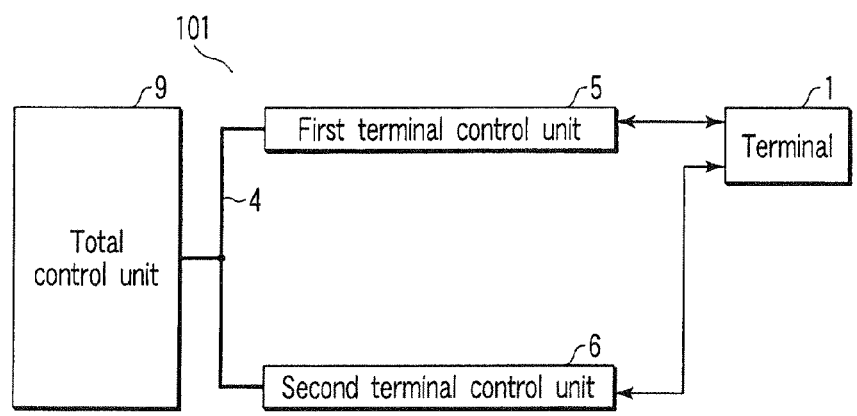
FIGS. 6A and 6B are respectively a block diagram and table for explaining the arrangement, a type of communication system, and the like of principal part required to conduct a hand-over test and interference test by the test apparatus for a radio communication terminal according to the present invention.

FIG. 6A is a diagram showing components which are extracted from FIG. 1 and are required to conduct a hand-over test between identical or different communication systems or an interference test shown in FIG. 6B for one terminal, as embodiment 3 that tests a terminal using the test apparatus for a radio communication terminal according to the present invention.

FIG. 6B shows a case wherein the terminal control units 5 and 6 serve as base station simulators of the W-CDMA communication system as an example of a hand-over test for one terminal between identical type of communication systems.

Also, FIG. 6B shows a case wherein the terminal control unit 5 serves as a base station simulator of the W-CDMA type of communication system, and the terminal control unit 6 serves as a base station simulator of the GSM type of communication system as an example of a hand-over test for one dual-mode terminal between different type of communication systems.

Furthermore, FIG. 6B shows a case wherein the terminal control unit 5 serves as a base station simulator of the W-CDMA type of communication system, and the terminal control unit 6 serves as an interference signal generator as an example of an interference measurement for one terminal.

In FIG. 6A, the total control unit 9 is connected to the first and second terminal control units 5 and 6 via the common bus 4.

Note that the first and second terminal control units 5 and 6 are connected to one terminal 1 of a predetermined type of communication system, which can make communications while roaming between a plurality of base stations, via the switch unit 3 and connection unit 17 (FIG. 1).

The total control unit 9 controls the first and second terminal control units 5 and 6 to load and execute programs according to the predetermined type of communication systems. Also, the total control unit 9 controls the first terminal control unit 5 to transmit test signals as one base station simulator to the terminal 1, and controls the second terminal control unit 6 to transmit test signals as another base station simulator to the terminal 1, thus conducting a hand-over test.

In the arrangement shown in FIG. 6A, the total control unit 9 interactively controls the terminal 1 via the first and second terminal control units 5 and 6 without using the measurement units 7 and 8, thus checking the test results based on responses from the terminal 1.

More specifically, the total control unit 9 normally measures responses or response times from the terminal 1 via the first and second terminal control units 5 and 6, and determines test results.

In embodiment 3, the total control unit 9 sends terminal control/test programs according to the type of communication systems of the terminal 1 to the terminal control units 5 and 6, which execute these programs, as in embodiments 1 and 2 described so far.

Figure 10:
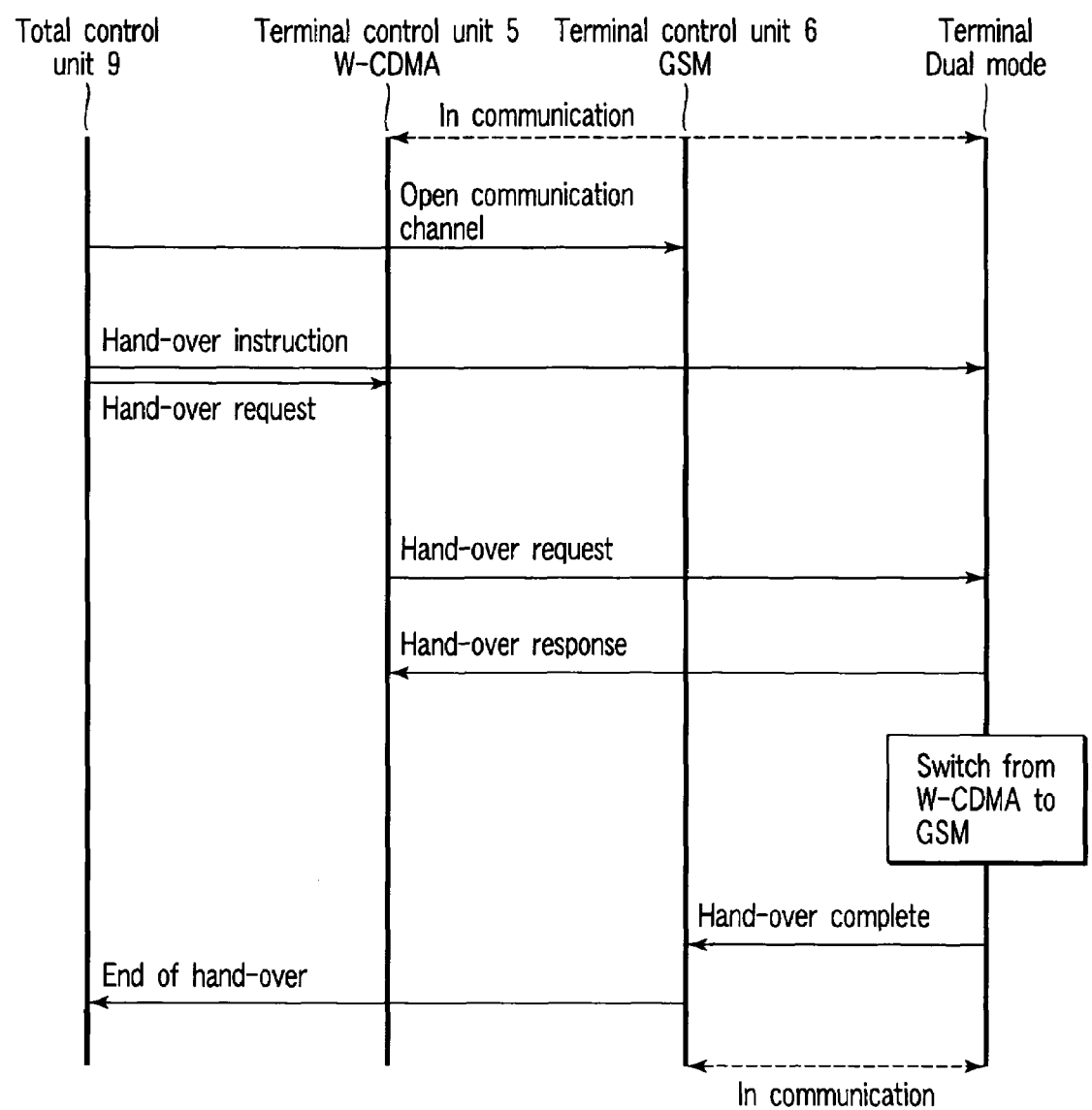
FIG. 10 is a chart for explaining the flow of control and measurement required to conduct a hand-over test by the test apparatus for a radio communication terminal according to the present invention.

FIG. 10 is a flowchart showing a hand-over control state when the terminal 1 has W-CDMA & GSM dual-mode type of communication systems.

In FIG. 10, while the terminal control unit 5 serves as a W-CDMA base station simulator and is making communications with the terminal 1 via test signals, the total control unit 9 controls the second terminal control unit 6 to set up a GSM base station simulator.

Upon reception of a hand-over instruction from the total control unit 9, the first terminal control unit 6 sends a hand-over request to the terminal 1 and receives a response (hand-over start) in response to that request.

During this interval, the terminal 1 temporarily receives both the test signal from the first terminal control unit 5 as the W-CDMA base station simulator and that from the second terminal control unit 6 as the GSM base station simulator. If the latter test signal power is larger, the terminal 1 switches only that test signal to a conversation target, and then sends a hand complete (switching complete) signal to the terminal control unit 6.

After that, the second terminal control unit 6 sends a hand-over end signal to the total control unit 9.

In such hand-over control, in order to prevent a communication between the W-CDMA and GSM base station simulators from being disconnected, an allowable time of a hand-over synchronization error is on the order of msec.

Hence, such timing errors and synchronization errors caused by the measurement system result in error factors. When a plurality of test apparatuses are used as in the prior arts, it becomes difficult to adjust the timings of control systems and to synchronize measurement systems, thus disturbing accurate measurements.

By contrast, according to the present invention, it is easy to adjust the timings of the control systems and to synchronize the measurement systems, thus allowing accurate measurements.

An interference measurement is conducted by the arrangement shown in FIG. 6A.

In case of this interference measurement, the total control unit 9 controls the first terminal control unit 5 to load and execute a program for an interference measurement corresponding to W-CDMA, and controls the second terminal control unit 6 to generate a test signal as an interference signal. Then, the test signal is transmitted to the terminal 1 together with that from the first terminal control unit 5, thus testing whether or not the terminal 1 operates normally.

That is, in this case, the test apparatus main body 101 tests between the total control unit 9 and terminal 1 if the same control and response processes as those between the total control unit 9 and terminal 1 (terminal control unit 5) in FIG. 9 that has been explained in embodiment 2 are done within a prescribed period of time.

As the interference signal, a signal diffused by a code different from a code of a channel to be received by the terminal 1 is input in case of the W-CDMA type of communication system.

As described above, the single test apparatus for a radio communication terminal according to the present invention can execute a hand-over test or interference test for one terminal.

<Embodiment 4: Parallel Measurement of a Plurality of Measurement Items of One Terminal>

Figures 7A, 7B:
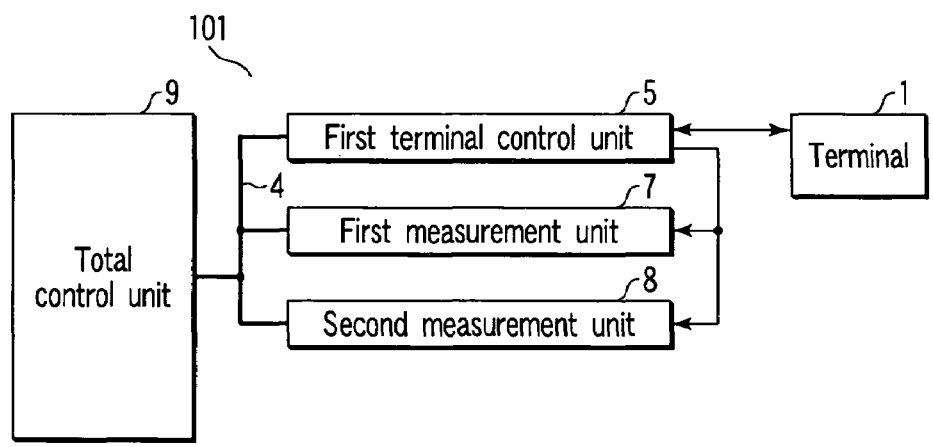
FIGS. 7A and 7B are respectively a block diagram and table for explaining the arrangement, a type of communication system, and the like of principal part required to simultaneously (parallelly) measure measurement items by the test apparatus for a radio communication terminal according to the present invention.

FIG. 7A is a diagram showing components which are extracted from FIG. 1 and are required to measure a plurality of measurement items, e.g., to parallelly make a power measurement and modulation level measurement for a terminal when the terminal to be tested is a portable phone having a predetermined type of communication system (e.g., W-CDMA), as shown in FIG. 7B, as embodiment 4 that tests a terminal using the test apparatus for a radio communication terminal according to the present invention.

FIG. 11C is a timing chart for explaining control and measurement of the test apparatus main body 101 with the arrangement shown in FIG. 7A.

Referring to FIG. 7A, the total control unit 9 is connected to the first terminal control unit 5 and the first and second measurement units 7 and 8 via the common bus 4.

Note that the first terminal control unit 5 is connected to one terminal 1 via the switch unit 3 and connection unit 17 (FIG. 1).

The first terminal control unit 5 outputs a test signal including a signal for controlling one terminal 1.

The first and second measurement units 7 and 8 receive a response signal, which is output from the terminal 1 in response to the test signal received from the first terminal control unit 5, via the first terminal control unit 5. Also, the first and second measurement units 7 and 8 parallelly perform measurements 1 and 2 of different measurement items for the terminal 1 based on that response signal.

The total control unit 9 controls the first terminal control unit 5 and the first and second measurement units 7 and 8 via the common bus 4 to perform predetermined control and measurements 1 and 2 of different measurement items for the terminal 1 in accordance with the predetermined type of communication system.

In FIG. 7A, the total control unit 9 controls the first terminal control unit 5 and the first and second measurement units 7 and 8 to load and execute a program for a terminal test corresponding to the W-CDMA type of communication system via the common bus 4.

That is, the total control unit 9 instructs the first and second measurement units 7 and 8 to parallelly perform measurements of first and second measurement items for one terminal 1.

For example, in FIG. 11C, the "position registration", "call termination", and "disconnection" control processes are done in the same manner as in FIGS. 11A and 11B, but the measurement unit 7 performs a power measurement as "measurement 1", and the measurement unit 8 performs a modulation level measurement as "measurement 2".

In this way, the measurement time for one terminal 1 can be shortened.

Also, embodiment 4 can be similarly applied to a case wherein the two terminals 1 and 2 are connected to the connection unit 17 (FIG. 1).

In this case, the test apparatus 101 uses the arrangement shown in FIG. 4, and the total control unit 9 makes control at timings that follow FIG. 11B.

That is, measurements 1 and 2 which are done at different timings in FIG. 11B are executed at the same timing, as shown in FIG. 11C.

For this purpose, the total control unit 9 instructs the first and second terminal control units 5 and 6 to control the first and second measurement units 7 and 8 at timings at which they can measure response signals from the two terminals 1 and 2 in different times. Also, the total control unit 9 instructs the first and second measurement units 7 and 8 to parallelly perform measurements of different first and second measurement items for at least one of the two terminals 1 and 2.

Note that the total control unit 9 controls the arrangement to be adopted in the above description and items to be measured by the test apparatus main body 101, and can display its state and measurement process on the display unit 15 under the control of the display control section 14.

The test apparatus for a radio communication terminal according to the present invention can cope with various manufacturing lines to have the two terminal control units and two measurement units as a base. However, this arrangement is a basic example, and the present invention is not limited to such basic example. Another arrangement that uses this basic example, i.e., an arrangement to which further terminal control units and measurement units are added, may be adopted.

As described above, since the test apparatus for a radio communication terminal according to the present invention adopts an arrangement which comprises two terminal control units, two measurement units, a program load configuration according to type of communication systems, and a total control unit that systematically controls the overall apparatus, the single test apparatus can selectively execute parallel measurement of a plurality of terminals of a plurality of type of communication systems, parallel measurement of a plurality of measurement items for one terminal, and various measurements (e.g., hand-over), the timings of which are important, for one terminal, as needed, thus obtaining advantages such as diversification support of manufacturing lines, test resource savings, test time savings, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A test apparatus for a radio communication terminal, comprising:
    a single housing; and
    a test apparatus main body provided in the single housing,
    wherein the test apparatus main body comprises:
        a connection unit to which is connectable to at least one
            of: (i) one radio communication terminal adopting one of GSM and W-CDMA communication systems, (ii) two radio communication terminals both adopting a same one of the GSM and W-CDMA communication systems, (iii) two radio communication terminals respectively adopting different ones of the GSM and W-CDMA communication systems, and (iv) a radio communication terminal adopting both the GSM and W-CDMA communication systems;

a common bus;

first and second independent terminal control units which are parallelly connected between the common bus and the connection unit, and which, when at least one said radio communication terminal adopting at least one of the GSM and W-CDMA communication systems is connected to the connection unit, output test signals including signals that control the at least one radio communication terminal based on measurement instructions and predetermined test programs corresponding to the at least one communication system adopted by the at least one radio communication terminal, said measurement instructions and predetermined test programs being supplied independently to the first terminal control unit and the second terminal control unit via the common bus;

first and second independent measurement units which are parallelly connected between the common bus and the connection unit, and which respectively perform measurements in accordance with conditions designated by the measurement instructions upon reception of response signals which are independently output from each said radio communication terminal connected to the connection unit in response to the test signals output from the first and second terminal control units; and a total control unit which supplies, in advance, the predetermined test programs according to the at least one of the GSM and W-CDMA communication systems adopted by the at least one radio communication terminal connected to the connection unit, and which outputs the measurement instructions at predetermined timings to the first and second terminal control units via the common bus, to cause the first and second terminal control units and the first and second measurement units to perform control and measurement, respectively, in synchronism with each other.

2. An apparatus according to claim 1, wherein when two radio communication terminals are connected to the connection unit, the total control unit instructs the first and second terminal control units to control the first and second measurement units at timings such that the first and second measurement units respectively measure the response signals from the two radio communication terminals at different times.

3. An apparatus according to claim 2, further comprising a data processing section which combines data measured by the first and second measurement units for each radio communication terminal.

4. An apparatus according to claim 2, wherein the total control unit further comprises:

a console;

a display unit;

a data memory which stores measurement results measured by the first and second measurement units for the radio communication terminals; and a display control section which reads out the measurement results from the data memory upon reception of an instruction from the console, and displays the read out measurement results on the display unit.

5. An apparatus according to claim 1, further comprising a switching unit which includes:

a first switch that is provided between the connection unit and the first and second terminal control units, to select one radio communication terminal connected to the connection unit as an object to be controlled by one of the first and second control units; and a second switch which is provided between the first and second terminal control units and the first and second measurement units, to select one radio communication terminal connected to the connection unit as an object to be measured by the first and second measurement units.

6. An apparatus according to claim 5, wherein when one radio communication terminal is connected to the connection unit, when the radio communication terminal is connected to the first terminal control unit by the first switch, and when the radio communication terminal is selected by the second switch as the object to be measured by the first and second measuring units, the total control unit instructs the first and second measurement units to perform respective measurements of first and second measurement items different from each other for the radio communication terminal.

7. An apparatus according to claim 5, wherein when one radio communication terminal adopting one of the GSM and W-CDMA communication systems so as to be capable of communication while roaming between a plurality of base stations is connected to the connection unit, to conduct a hand-over test:

the switching unit causes the first and second terminal control units to be connected in parallel to an output of the radio communication terminal by the first switch; and the total control unit controls the first and second terminal control units to load and execute predetermined test programs according to the one of the GSM and W-CDMA communication systems adopted by the one radio communication terminal, controls the first terminal control unit to transmit a test signal as one base station simulator to the radio communication terminal, and controls the second terminal control unit to transmit a test signal as another base station simulator to the radio communication terminal so as to conduct the hand-over test.

8. An apparatus according to claim 5, wherein one radio communication terminal adopting both the GSM and W-CDMA communication systems so as to be capable of communication while roaming between two base stations of the GSM and W-CDMA communication systems, respectively, is connected to the connection unit, to conduct a hand-over test between two base stations of the GSM and W-CDMA communication systems:

the switching unit causes the first and second terminal control units to be connected in parallel to an output of the radio communication terminal by the first switch; and the total control unit controls the first and second terminal control units to load and execute predetermined test programs according to the GSM and W-CDMA communication systems, controls the first terminal control unit to transmit a test signal as a base station simulator of a first one the GSM and W-CDMA communication systems to the radio communication terminal, and controls the second terminal control unit to transmit a test signal as a base station simulator of a second one of the GSM and W-CDMA communication systems to the radio communication terminal so as to conduct the hand-over test.

9. An apparatus according to claim 1, further comprising a data processing section which combines data measured by the first and second measurement units for each radio communication terminal.

10. An apparatus according to claim 5, wherein the total control unit, is adapted to selectively implement, together with the switching unit, at least one of:
(a) a first arrangement for, when the two radio communication terminal both adopting a same one of the GSM and W-CDMA communication systems are connected to the connection unit, causing the first and second terminal control units to load and execute predetermined test programs corresponding to the said same one of the GSM and W-CDMA communication systems, so as to control the first terminal control unit and the first measurement unit to perform control and measurement processes of one of the radio communication terminals, and so as to control the second terminal control unit and the second measurement unit to perform control and measurement of another of the radio communication terminals;
(b) a second arrangement for, when the two radio communication terminals respectively adopting different ones of the GSM and W-CDMA communication systems are connected to the connection unit, causing the first and second terminal control units to respectively load and execute predetermined test programs corresponding to the GSM and W-CDMA communication systems so as to control the first terminal control unit and the first measurement unit to perform control and measurement processes of one of the radio communication terminals, and to control the second terminal control unit and the second measurement unit to perform control and measurement processes of another of the radio communication terminals; and
(c) a third arrangement for, when the radio communication terminal adopting both the GSM and W-CDMA communication systems is connected to the connection unit, causing the first and second terminal control units to respectively load and execute predetermined test programs corresponding to the GSM and W-CDMA communication systems so as to control the first terminal control unit and the first measurement unit to perform control and measurement processes of the radio communication terminal based on a first one of the GSM and W-CDMA communication systems, and so as to control the second terminal control unit and the second measurement unit to perform control and measurement processes of the radio communication terminal based on a second one of the GSM and W-CDMA communication systems.

11. An apparatus according to claim 5, wherein the total control unit, is adapted to selectively implement, together with the switching unit, at least one of:
(a) a first arrangement for, when the two radio communication terminal both adopting a same one of the GSM and W-CDMA communication systems are connected to the connection unit, causing the first and second terminal control units to load and execute predetermined test programs corresponding to the said same one of the GSM and W-CDMA communication systems, so as to control the first terminal control unit and the first measurement unit to perform control and measurement processes of one of the radio communication terminals, and so as to control the second terminal control unit and the second measurement unit to perform control and measurement of another of the radio communication terminals;
(b) a second arrangement for, when the two radio communication terminals respectively adopting different ones of the GSM and W-CDMA communication systems are connected to the connection unit, causing the first and second terminal control units to respectively load and execute predetermined test programs corresponding to the GSM and W-CDMA communication systems so as to control the first terminal control unit and the first measurement unit to perform control and measurement processes of one of the radio communication terminals, and to control the second terminal control unit and the second measurement unit to perform control and measurement processes of another of the radio communication terminals;
(c) a third arrangement for, when the radio communication terminal adopting both the GSM and W-CDMA communication systems is connected to the connection unit, causing the first and second terminal control units to respectively load and execute predetermined test programs corresponding to the GSM and W-CDMA communication systems so as to control the first terminal control unit and the first measurement unit to perform control and measurement processes of the radio communication terminal based on a first one of the GSM and W-CDMA communication systems, and so as to control the second terminal control unit and the second measurement unit to perform control and measurement processes of the radio communication terminal based on a second one of the GSM and W-CDMA communication systems; and
(d) a fourth arrangement for, the radio communication terminal adopting one of the GSM and W-CDMA communication systems is connected to the connection unit, causing the first terminal control unit to load and execute a predetermined test program corresponding to the one of the GSM and W-CDMA communication systems adopted by the radio communication terminal, so as to control the radio communication terminal and the first and second measurement units to simultaneously perform measurement processes of different functions or performance of the radio communication terminal.

12. An apparatus according to claim 5, wherein the total control unit, is adapted to selectively implement, together with the switching unit, at least one of:
(a) a first arrangement for, when the two radio communication terminal both adopting a same one of the GSM and W-CDMA communication systems are connected to the connection unit, causing the first and second terminal control units to load and execute predetermined test programs corresponding to the said same one of the GSM and W-CDMA communication systems, so as to control the first terminal control unit and the first measurement unit to perform control and measurement processes of one of the radio communication terminals, and so as to control the second terminal control unit and the second measurement unit to perform control and measurement of another of the radio communication terminals;
(b) a second arrangement for, when the two radio communication terminals respectively adopting different ones of the GSM and W-CDMA communication systems are connected to the connection unit, causing the first and second terminal control units to respectively load and execute predetermined test programs corresponding to the GSM and W-CDMA communication systems so as to control the first terminal control unit and the first measurement unit to perform control and measurement processes of one of the radio communication terminals, and to control the second terminal control unit and the second measurement unit to perform control and measurement processes of another of the radio communication terminals;

(c) a third arrangement for, when the radio communication terminal adopting both the GSM and W-CDMA communication systems is connected to the connection unit, causing the first and second terminal control units to respectively load and execute predetermined test programs corresponding to the GSM and W-CDMA communication systems so as to control the first terminal control unit and the first measurement unit to perform control and measurement processes of the radio communication terminal based on a first one of the GSM and W-CDMA communication systems, and so as to control the second terminal control unit and the second measurement unit to perform control and measurement processes of the radio communication terminal based on a second one of the GSM and W-CDMA communication systems;

(d) a fourth arrangement for, when the radio communication terminal adopting one of the GSM and W-CDMA communication systems is connected to the connection unit, causing the first terminal control unit to load and execute a predetermined test program corresponding to the one of the GSM and W-CDMA communication systems adopted by the radio communication terminal, so as to control the radio communication terminal and the first and second measurement units to simultaneously perform measurement processes of different functions or performance of the radio communication terminal; and (e) a fifth arrangement for, when the radio communication terminal adopting one of the GSM and W-CDMA communication systems is connected to the connection unit, causing the first terminal control unit to transmit a test signal including an interference signal to the radio communication terminal, and causing the second terminal control unit to load and execute a predetermined test program corresponding to the one of the GSM and W-CDMA communication systems adopted by the radio communication terminal, so as to control the radio communication terminal and to conduct an interference test based on a response from the radio communication terminal.

13. An apparatus according to claim 1, wherein the total control unit further comprises:
a console;
a display unit;
a data memory which stores measurement results measured by the first and second measurement units for the at least one radio communication terminal; and
a display control section which reads out the measurement results from the data memory upon reception of an instruction from the console, and displays the read out measurement results on the display unit.

14. An apparatus according to claim 13, wherein the display control section selectively displays at least one of the measurement results of the at least one radio communication terminal and measurement conditions designated by the measurement instructions, upon reception of an instruction from the console.

15. A test method for a radio communication terminal, comprising:
a) providing a test apparatus main body in a single housing, wherein the test apparatus main body comprises:
a connection unit to which is connectable to at least one of: (i) one radio communication terminal adopting one of GSM and W-CDMA communication systems, (ii) two radio communication terminals both adopting a same one of the GSM and W-CDMA communication systems, (iii) two radio communication terminals respectively adopting different ones of the GSM and W-CDMA communication systems, and (iv) a radio communication terminal adopting both the GSM and W-CDMA communication systems;
a common bus;
first and second independent terminal control units which are connected between the common bus and the connection unit;
first and second independent measurement units which are connected between the common bus and the connection unit; and
a total control unit which is connected to the common bus and stores predetermined test programs according to the GSM and W-CDMA communication systems and measurement instructions in an internal memory,
b) when at least one said radio communication terminal adopting at least one of the GSM and W-CDMA communication systems is connected to the connection unit, causing the total control unit to supply, in advance, the predetermined test programs according to the at least one of the GSM and W-CDMA communication systems adopted by the at least one radio communication terminal, and to output the measurement instructions at predetermined timings to the first and second terminal control units via the common bus;
c) causing the first and second terminal control units to output test signals including signals that control the at least one connected radio communication terminal based on the measurement instructions and the predetermined test programs corresponding to the at least one communication system adopted by the at least one radio communication terminal; and
d) causing the first and second measurement units to perform respective measurements in accordance with conditions designated by the measurement instructions upon reception of response signals which are output from each said radio communication terminal connected to the connection unit in response to the test signals output from the first and second terminal control units
wherein the total control unit outputs the measurement instructions at predetermined timings to the first and second terminal control units via the common bus, to cause the first and second terminal control units and the first and second measurement units to perform control and measurement, respectively, in synchronization with each other.

16. A method according to claim 15, wherein when two radio communication terminals are connected to the connection unit, the total control unit instructs the first and second terminal control units to control the first and second measurement units at timings such that the first and second measurement units respectively measure the response signals from the two radio communication terminals at different times.

17. A method according to claim 16, further comprising providing a data processing section which combines data measured by the first and second measurement units for each radio communication terminal.

18. A method according to claim 16, wherein the total control unit further comprises:
a console;
a display unit;
a data memory which stores measurement results measured by the first and second measurement units for the radio communication terminals; and
a display control section which reads out the measurement results from the data memory upon reception of an instruction from the console, and displays the read out measurement results on the display unit.

19. A method according to claim 15, wherein the test apparatus main body further comprises a switching unit which includes: a first switch provided between the connection unit and the first and second terminal control units, and a second switch provided between the first and second terminal control units and the first and second measurement units; and
wherein the method further comprises:
setting the first switch to select one radio communication terminal connected to the connection unit as an object to be controlled by one of the first and second control units; and
setting the second switch to select one radio communication terminal connected to the connection unit as an object to be measured by the first and second measurement units.

20. A method according to claim 19, wherein one radio communication terminal is connected to the connection unit, and the method further comprises:
connecting the radio communication terminal to the first terminal control unit by the first switch;
selecting the radio communication terminal by the second switch as the object to be measured by the first and second measuring units; and
instructing, by the total control unit, the first and second measurement units to perform respective measurements of first and second measurement items different from each other for the radio communication terminal.

21. A method according to claim 19, wherein one radio communication terminal adopting one of the GSM and W-CDMA communication systems so as to be capable of communication while roaming between a plurality of base stations is connected to the connection unit, and the method further comprises conducting a hand-over test by:
setting the switching unit such that the first and second terminal control units are connected in parallel to an output of the radio communication terminal by the first switch; and
controlling, by the total control unit, the first and second terminal control units to load and execute predetermined test programs according to the one of the GSM and W-CDMA communication systems adopted by the one radio communication terminal, controlling, by the total control unit, the first terminal control unit to transmit a test signal as one base station simulator to the radio communication terminal, and controlling, by the total control unit, the second terminal control unit to transmit a test signal as another base station simulator to the radio communication terminal so as to conduct the hand-over test.

22. A method according to claim 19, wherein one radio communication terminal adopting both the GSM and W-CDMA communication systems so as to be capable of communication while roaming between two base stations of the GSM and W-CDMA communication systems, respectively, is connected to the connection unit, and the method further comprises conducting a hand-over test between two base stations of the GSM and W-CDMA communication systems by:
setting the switching unit such that the first and second terminal control units are connected in parallel to an output of the radio communication terminal by the first switch; and
controlling, by the total control unit, the first and second terminal control units to load and execute predetermined test programs according to the GSM and W-CDMA communication systems, controlling, by the total control unit, the first terminal control unit to transmit a test signal as a base station simulator of a first one the GSM and W-CDMA communication systems to the radio communication terminal, and controlling, by the total control unit, the second terminal control unit to transmit a test signal as a base station simulator of a second one of the GSM and W-CDMA communication systems to the radio communication terminal so as to conduct the hand-over test.

23. A method according to claim 15, further comprising providing a data processing section which combines data measured by the first and second measurement units for each radio communication terminal.

24. A method according to claim 19, wherein the total control unit, together with the switching unit, are selectively caused to implement at least one of:
(a) a first arrangement for, when the two radio communication terminal both adopting a same one of the GSM and W-CDMA communication systems are connected to the connection unit, causing the first and second terminal control units to load and execute predetermined test programs corresponding to the said same one of the GSM and W-CDMA communication systems, so as to control the first terminal control unit and the first measurement unit to perform control and measurement processes of one of the radio communication terminals, and so as to control the second terminal control unit and the second measurement unit to perform control and measurement of another of the radio communication terminals;
(b) a second arrangement for, when the two radio communication terminals respectively adopting different ones of the GSM and W-CDMA communication systems are connected to the connection unit, causing the first and second terminal control units to respectively load and execute predetermined test programs corresponding to the GSM and W-CDMA communication systems so as to control the first terminal control unit and the first measurement unit to perform control and measurement processes of one of the radio communication terminals, and to control the second terminal control unit and the second measurement unit to perform control and measurement processes of another of the radio communication terminals; and
(c) a third arrangement for, when the radio communication terminal adopting both the GSM and W-CDMA communication systems is connected to the connection unit, causing the first and second terminal control units to respectively load and execute predetermined test programs corresponding to the GSM and W-CDMA communication systems so as to control the first terminal control unit and the first measurement unit to perform control and measurement processes of the radio communication terminal based on a first one of the GSM and W-CDMA communication systems, and so as to control the second terminal control unit and the second measurement unit to perform control and measurement processes of the radio communication terminal based on a second one of the GSM and W-CDMA communication systems.

25. A method according to claim 19, wherein the total control unit, together with the switching unit, are selectively caused to implement at least one of:
 (a) a first arrangement for, when the two radio communication terminal both adopting a same one of the GSM and W-CDMA communication systems are connected to the connection unit, causing the first and second terminal control units to load and execute predetermined test programs corresponding to the said same one of the GSM and W-CDMA communication systems, so as to control the first terminal control unit and the first measurement unit to perform control and measurement processes of one of the radio communication terminals, and so as to control the second terminal control unit and the second measurement unit to perform control and measurement of another of the radio communication terminals;
 (b) a second arrangement for, when the two radio communication terminals respectively adopting different ones of the GSM and W-CDMA communication systems are connected to the connection unit, causing the first and second terminal control units to respectively load and execute predetermined test programs corresponding to the GSM and W-CDMA communication systems so as to control the first terminal control unit and the first measurement unit to perform control and measurement processes of one of the radio communication terminals, and to control the second terminal control unit and the second measurement unit to perform control and measurement processes of another of the radio communication terminals;
 (c) a third arrangement for, when the radio communication terminal adopting both the GSM and W-CDMA communication systems is connected to the connection unit, causing the first and second terminal control units to respectively load and execute predetermined test programs corresponding to the GSM and W-CDMA communication systems so as to control the first terminal control unit and the first measurement unit to perform control and measurement processes of the radio communication terminal based on a first one of the GSM and W-CDMA communication systems, and so as to control the second terminal control unit and the second measurement unit to perform control and measurement processes of the radio communication terminal based on a second one of the GSM and W-CDMA communication systems; and
 (d) a fourth arrangement for, the radio communication terminal adopting one of the GSM and W-CDMA communication systems is connected to the connection unit, causing the first terminal control unit to load and execute a predetermined test program corresponding to the one of the GSM and W-CDMA communication systems adopted by the radio communication terminal, so as to control the radio communication terminal and the first and second measurement units to simultaneously perform measurement processes of different functions or performance of the radio communication terminal.

26. A method according to claim 19, wherein the total control unit, together with the switching unit, are selectively caused to implement at least one of:
 (a) a first arrangement for, when the two radio communication terminal both adopting a same one of the GSM and W-CDMA communication systems are connected to the connection unit, causing the first and second terminal control units to load and execute predetermined test programs corresponding to the said same one of the GSM and W-CDMA communication systems, so as to control the first terminal control unit and the first measurement unit to perform control and measurement processes of one of the radio communication terminals, and so as to control the second terminal control unit and the second measurement unit to perform control and measurement of another of the radio communication terminals;
 (b) a second arrangement for, when the two radio communication terminals respectively adopting different ones of the GSM and W-CDMA communication systems are connected to the connection unit, causing the first and second terminal control units to respectively load and execute predetermined test programs corresponding to the GSM and W-CDMA communication systems so as to control the first terminal control unit and the first measurement unit to perform control and measurement processes of one of the radio communication terminals, and to control the second terminal control unit and the second measurement unit to perform control and measurement processes of another of the radio communication terminals;
 (c) a third arrangement for, when the radio communication terminal adopting both the GSM and W-CDMA communication systems is connected to the connection unit, causing the first and second terminal control units to respectively load and execute predetermined test programs corresponding to the GSM and W-CDMA communication systems so as to control the first terminal control unit and the first measurement unit to perform control and measurement processes of the radio communication terminal based on a first one of the GSM and W-CDMA communication systems, and so as to control the second terminal control unit and the second measurement unit to perform control and measurement processes of the radio communication terminal based on a second one of the GSM and W-CDMA communication systems;
 (d) a fourth arrangement for, when the radio communication terminal adopting one of the GSM and W-CDMA communication systems is connected to the connection unit, causing the first terminal control unit to load and execute a predetermined test program corresponding to the one of the GSM and W-CDMA communication systems adopted by the radio communication terminal, so as to control the radio communication terminal and the first and second measurement units to simultaneously perform measurement processes of different functions or performance of the radio communication terminal; and (e) a fifth arrangement for, when the radio communication terminal adopting one of the GSM and W-CDMA communication systems is connected to the connection unit, causing the first terminal control unit to transmit a test signal including an interference signal to the radio communication terminal, and causing the second terminal control unit to load and execute a predetermined test program corresponding to the one of the GSM and W-CDMA communication systems adopted by the radio communication terminal, so as to control the radio communication terminal and to conduct an interference test based on a response from the radio communication terminal.

27. A method according to claim 15, wherein the total control unit further comprises:

a console;
a display unit;
a data memory which stores measurement results measured by the first and second measurement units for the at least two radio communication terminals; and
a display control section which reads out the measurement results from the data memory upon reception of an instruction from the console, and displays the read out measurement results on the display unit.

28. A method according to claim 27, wherein the display control section selectively displays at least one of the measurement results of the at least one radio communication terminal and measurement conditions designated by measurement instructions upon reception of an instruction from the console.

* * * * *